United States Patent
Sjödin et al.

(10) Patent No.: US 9,849,534 B2
(45) Date of Patent: Dec. 26, 2017

(54) BRAZING CONCEPT

(71) Applicant: ALFA LAVAL CORPORATE AB, Lund (SE)

(72) Inventors: Per Sjödin, Lund (SE); Kristian Walter, Genarp (SE)

(73) Assignee: ALFA LAVAL CORPORATE AB, Lund (SE)

( * ) Notice: Subject to any disclaimer, the term of this patent is extended or adjusted under 35 U.S.C. 154(b) by 345 days.

(21) Appl. No.: 14/387,061

(22) PCT Filed: Mar. 27, 2013

(86) PCT No.: PCT/EP2013/056554
§ 371 (c)(1),
(2) Date: Sep. 22, 2014

(87) PCT Pub. No.: WO2013/144222
PCT Pub. Date: Oct. 3, 2013

(65) Prior Publication Data
US 2015/0086776 A1 Mar. 26, 2015

(30) Foreign Application Priority Data
Mar. 28, 2012 (EP) .................................... 12161742

(51) Int. Cl.
*B23K 35/24* (2006.01)
*B23K 1/20* (2006.01)
(Continued)

(52) U.S. Cl.
CPC ................ *B23K 1/20* (2013.01); *B21D 53/04* (2013.01); *B23K 1/00* (2013.01); *B23K 1/0008* (2013.01);
(Continued)

(58) Field of Classification Search
None
See application file for complete search history.

(56) References Cited

U.S. PATENT DOCUMENTS 3,262,762 A * 7/1966 Bechtold ............. C22C 32/0047
419/13
4,614,296 A 9/1986 Lesgourgues
(Continued)

FOREIGN PATENT DOCUMENTS

CN 101588890 A 11/2009
EP 1982781 A1 10/2008
(Continued)

OTHER PUBLICATIONS

Chinese Office Action and Search Report, dated Nov. 27, 2015, for Chinese Application No. 201380017372.9.
(Continued)

*Primary Examiner* — Alexandre F Ferre
(74) *Attorney, Agent, or Firm* — Birch, Stewart, Kolasch & Birch, LLP

(57) ABSTRACT

The present invention relates to a blend of at least one boron source and at least one silicon source, wherein the blend comprises boron and silicon in a weight ratio boron to silicon within a range from about 5:100 to about 2:1, wherein silicon and boron are present in the blend in at least 25 wt %, and wherein the at least one boron source and the at least one silicon source are oxygen free except for inevitable amounts of contaminating oxygen, and wherein the blend is a mechanical blend of powders, and wherein particles in the powders have an average particle size less than 250 μm. The present invention relates further to a composition comprising the blend a substrate applied with the blend, a method for providing a brazed product, and uses.

35 Claims, 3 Drawing Sheets

(51) Int. Cl.

| | |
|---|---|
| B23K 35/02 | (2006.01) |
| B23K 35/36 | (2006.01) |
| B23K 35/365 | (2006.01) |
| B23K 35/00 | (2006.01) |
| C22C 19/00 | (2006.01) |
| C22C 1/02 | (2006.01) |
| B23K 1/00 | (2006.01) |
| B23K 35/34 | (2006.01) |
| B23K 35/362 | (2006.01) |
| C23C 30/00 | (2006.01) |
| B21D 53/04 | (2006.01) |
| F28D 9/00 | (2006.01) |
| B32B 15/01 | (2006.01) |
| C23C 24/10 | (2006.01) |
| B23K 20/00 | (2006.01) |
| B23K 20/24 | (2006.01) |
| F28F 3/04 | (2006.01) |
| F28F 21/08 | (2006.01) |
| B23K 101/00 | (2006.01) |

(52) U.S. Cl.
CPC ............ *B23K 1/0012* (2013.01); *B23K 1/203* (2013.01); *B23K 20/002* (2013.01); *B23K 20/24* (2013.01); *B23K 35/00* (2013.01); *B23K 35/001* (2013.01); *B23K 35/004* (2013.01); *B23K 35/007* (2013.01); *B23K 35/02* (2013.01); *B23K 35/025* (2013.01); *B23K 35/0244* (2013.01); *B23K 35/24* (2013.01); *B23K 35/34* (2013.01); *B23K 35/36* (2013.01); *B23K 35/362* (2013.01); *B23K 35/365* (2013.01); *B23K 35/3613* (2013.01); *B32B 15/01* (2013.01); *C22C 1/02* (2013.01); *C22C 19/00* (2013.01); *C23C 24/10* (2013.01); *C23C 30/00* (2013.01); *C23C 30/005* (2013.01); *F28D 9/0062* (2013.01); *B23K 2201/00* (2013.01); *F28D 9/0012* (2013.01); *F28F 3/042* (2013.01); *F28F 21/083* (2013.01); *F28F 21/089* (2013.01); *Y10T 29/49366* (2015.01); *Y10T 403/479* (2015.01); *Y10T 428/12778* (2015.01); *Y10T 428/12986* (2015.01); *Y10T 428/25* (2015.01); *Y10T 428/259* (2015.01); *Y10T 428/266* (2015.01); *Y10T 428/273* (2015.01); *Y10T 428/2924* (2015.01); *Y10T 428/2982* (2015.01)

(56) References Cited

U.S. PATENT DOCUMENTS

| | | | |
|---|---|---|---|
| 5,013,612 A * | 5/1991 | Hunt | B23K 35/32 428/469 |
| 6,109,505 A | 8/2000 | Malie et al. | |
| 6,708,869 B2 * | 3/2004 | Hyogo | F28F 9/18 228/183 |
| 2003/0200835 A1 | 10/2003 | Malie et al. | |
| 2004/0023056 A1 | 2/2004 | Braillard et al. | |
| 2004/0056074 A1 | 3/2004 | Sjodin | |
| 2004/0091627 A1 | 5/2004 | Ohara et al. | |
| 2005/0067061 A1 | 3/2005 | Huang et al. | |
| 2008/0290137 A1 | 11/2008 | Budinger | |
| 2009/0165893 A1 * | 7/2009 | Akazawa | B23K 35/0244 148/24 |
| 2009/0305078 A1 | 12/2009 | Sjodin | |
| 2010/0215983 A1 | 8/2010 | Patel et al. | |

FOREIGN PATENT DOCUMENTS

| | | |
|---|---|---|
| EP | 2193874 A1 | 6/2010 |
| JP | 59-10491 A | 1/1984 |
| JP | 2000-61653 A | 2/2000 |
| JP | 2002-361479 A | 12/2002 |
| JP | 2005-103641 A | 4/2005 |
| JP | 2008-542030 A | 11/2008 |
| JP | 2010-510067 A | 4/2010 |
| KR | 10-2008-0015871 A | 2/2008 |
| KR | 10-2009-0084942 A | 8/2009 |
| RU | 2003 117 585 A | 1/2005 |
| SD | 199651 A | 7/1967 |
| WO | 02/38327 A1 | 5/2002 |
| WO | WO 2006/126953 A1 | 11/2006 |
| WO | WO 2008/060225 A1 | 5/2008 |
| WO | WO 2008/060226 A2 | 5/2008 |
| WO | WO 2009/031545 A1 | 3/2009 |

OTHER PUBLICATIONS

Russian Office Action and Search Report, dated Dec. 23, 2015, for Russian Application No. 2014143253.
Singaporean Written Opinion for Singaporean Application No. 11201406138T, dated Apr. 14, 2015.
English translation of Japanese Office Action for Japanese Application No. 2015-502330, dated Nov. 2, 2015.
English translation of Korean Office Action for Korean Application No. 10-2014-7026737, dated Nov. 4, 2015.

\* cited by examiner

US 9,849,534 B2

BRAZING CONCEPT

The present invention relates to a novel brazing concept, a blend, a composition, a product. The present invention relates further to a method for providing a brazed product, to a brazed product obtained by the method, and to uses.

BACKGROUND

Today there are different joining methods for joining together alloys having high melting temperatures. By high temperature a melting temperature higher than 900° C. is intended. One common method which is used is welding. Welding refers to a method wherein the base material with or without additional material is melted, i.e. creation of a cast product via melting and re-solidification. Another joining method is brazing. During the brazing process a braze filler is added to the base material, and the braze filler is melted during the process at a temperature above 450° C., i.e. forming a liquid interface, at a temperature lower than liquidus temperature of the base material to be joined. When brazing the liquid interface should have good wetting and flow. Soldering is a process in which two or more metal items are joined together by melting and flowing of a filler metal, i.e. a solder, into the joint, the solder having a lower melting point than the work-piece. In brazing, the filler metal melts at a higher temperature than the solder, but the work-piece metal does not melt. The distinction between soldering and brazing is based on the melting temperature of the filler alloy. A temperature of 450° C. is usually used as a practical delineating point between soldering and brazing.

When brazing a braze filler is applied in contact with the gap or the clearance between the base material to be joined. During the heating process the braze filler melts and fills the gap to be joined. In the brazing process there are three major stages the first stage is called the physical stage. The physical stage includes wetting and flowing of the braze filler. The second stage normally occurs at a given joining temperature. During this stage there is solid-liquid interaction, which is accompanied by substantial mass transfer. The base material volume that immediately adjoins the liquid filler metal either dissolves or is reacted with the filler metal in this stage. At the same time a small amount of elements from the liquid phases penetrates into the solid base material. This redistribution of components in the joint area results in changes to the filler metal composition, and sometimes, the onset of solidification of the filler metal. The last stage, which overlaps the second, is characterized by the formation of the final joint microstructure and progresses during solidification and cooling of the joint.

A method closely related to welding and brazing is diffusion brazing (DFB) also called Transient Liquid-phase bonding (TLP), or Activated Diffusion Bonding (ADB). Sometimes diffusion bonding is mentioned, but diffusion bonding refers to diffusion brazing or diffusion welding and now diffusion bonding is considered to be a non-standard term.

Diffusion brazing (DFB), Transient Liquid-phase bonding (TLP), or Activated Diffusion Bonding (ADB) is a process that coalesces, or joins, metals by heating them to a suitable brazing temperature at which either a preplaced filler metal will melt or flow by capillary attraction or a liquid phase will form in situ between two surfaces in contact with each other. In either case, the filler metal diffuses into the base material until the physical and mechanical properties of the joint become almost identical to those of the base metal. Two critical aspects of DFB, TLP, or ADB are that:

a liquid must be formed and become active in the joint area; and extensive diffusion of the filler metal elements into the base material must occur.

Ways of obtaining a joint close or the same as the one obtained when DFB, TLP, or ADB is used, but has the advantage of brazing, e.g having the possibility to braze larger gaps etc, is by using a brazing technique and braze fillers disclosed by WO 2002/38327, WO 2008/060225 and WO 2008/060226. By using a braze filler, i.e. a braze alloy, with a composition close to the base material but with added melting point depressants, e.g. silicon and/or boron and/or phosphorus. By doing this the braze joint will have a composition close to the base material after brazing since braze filler had a similar composition as the base material, the braze filler blends with the base material due to dissolution of the base material and the melting point depressants diffuses into the base material.

There are many reasons for selecting a certain joining method, such as cost, productivity, safety, speed and properties of the joined product. Closely related E-modules will decrease the risk of high stresses in the material with higher E-module when the material is loaded. When the thermal expansion coefficient is similar the result will decrease the thermally induced stresses. When the electrochemical potential is similar the result will decrease the risk for corrosion.

The use of fillers, i.e. alloys, when joining base metals is a complicated process. The filler has to be in a form that could be applied to the base metal before heating. Usually the fillers are particles suitably produced by atomization, but the fillers may also be in form of foils produced by "melt-spinning", i.e. rapid solidification (RS). Regarding RS only a limited number of compositions are possible to produce by RS. The number of compositions that can be made as particles, i.e. powder, is greater and the normal production of powders is by atomizing. When the fillers are in form of powders then they are often combined with binders to form a paste, which could be applied to the base metal in any suitable way. To produce foils or to produce alloy powders are complicated processes and therefore costly. When powders are used the powders are suitable applied in form of a paste as mentioned above, this will add an extra step to the process since the paste need to be blended with the binders and other components, which are beneficial for the paste's properties. For both processes a great amount of work is carried out to get the right form, properties, shape and composition of the filler before melting and joining.

The Invention

A purpose for the invention is to reduce the process steps when joining substrates of parent materials. Another purpose is to simplify the joining of the parent materials and thus reduce costs.

If possible, when selecting braze fillers, a composition close to the parent material is beneficial, since the parent material has been selected for the product purposes. If it would have been possible and cost was no limit, it would be best to develop one braze filler for each parent material. Therefore, another purpose with the invention is to decrease the needed number of braze fillers.

Accordingly, the present invention provides a solution to the technical problems and purposes by the novel and inventive brazing concept. The first aspect relates to a blend of at least one boron source and at least one silicon source, wherein the blend comprises boron and silicon in a weight ratio boron to silicon within a range from about 3:100 wt/wt to about 100:3 wt/wt, preferably within a range from about 5:100 wt/wt to about 2:1 wt/wt, more preferred from about 5:100 wt/wt to about 1:1 wt/wt, wherein silicon and boron are present in the blend in at least 25 wt %, preferably silicon and boron are present in the blend in at least 35 wt %. The at least one boron source and the at least one silicon source are oxygen free except for inevitable amounts of contaminating oxygen, and wherein the blend is mechanical blend of powders and particles in the powders may have an average particle size less than 250 μm, preferably the particles in the powders have an average particle size less than 160 μm, more preferred the particle have an average particle size less than 100 μm.

A blend of the present invention is advantageous in that it provides possibilities to obtain joints between substrates. The obtained joints are of similar material as the material(s) of the substrates except that the joints contain additional amounts of the elements of the blend. By allowing the formation of joints of the material in the substrates according to the novel brazing concept, the corrosion risks can be avoided or at least lowered since there will be less differences between the material in the joints and the substrate compared to when commercial brazing materials are used.

Substrates refer to parts of an obtainable product, the parts could be for instance but not limited to thick parts such as separators or decanters etc. or thin parts such as plates or coils. The substrates could be any parts that should be joined or coated. Substrate could also be work-pieces. The substrates are of parent materials, i.e. material to be brazed. The parent materials refer to parent metals or parent alloys, said parent metal or parent alloys are suitable to braze. Examples of parent materials, can be found in Table 1, the invention is not limited to the examples in Table 1.

The parent material may be an alloy comprising elements such as iron (Fe), chromium (Cr), nickel (Ni), molybdenum (Mo), manganese (Mn), copper (Cu), cobolt (Co) etc. Examples of such alloys are found in the list in Table 1, the parent materials are not limited to the list and are just examples of possible parent materials.

TABLE 1

| Parent materials | Approximate. solidus temperature [° C.] | Approximate. liquidus temperature [° C.] |
|---|---|---|
| Nickel 200/201 | 1435 | 1445 |
| Nicrofer 5923hMo | 1310 | 1360 |
| Hastelloy ® C-2000 ® Alloy | 1328 | 1358 |
| Hastelloy B3 | 1370 | 1418 |
| Alloy C22 | 1357 | 1399 |
| Inconel 625 | 1290 | 1350 |
| Alloy C 276 | 1325 | 1370 |
| Nicrofer 3033 | 1330 | 1370 |
| Nicrofer 3127HMo | 1350 | 1370 |
| AL6XN | 1320 | 1400 |
| 254SMO | 1325 | 1400 |
| Monel 400 | 1299 | 1348 |
| Mild steel | 1505 | 1535 |
| Stainless steel Type 316 | 1390 | 1440 |
| Stainless steel type 304 | 1399 | 1421 |

Parent material refers to a metal or an alloy. Alloy is defined as an intimate association or compound of two or more elements, the alloy possessing a marked degree of all or most of those characteristics commonly described as metallic. Alloys are compounds not mere mixtures. A metal refers to an element which has metallic properties.

Compounds are combinations of two or more elements. Glass, steel, iron oxide are compounds wherein every atom is attracted by all the adjacent atoms so as to make a uniform or very nearly uniform solid, such bodies are clearly not mere mechanical mixtures, chemical compounds of varying or indefinite composition such as silicates, polymers are chemically combined but are compound of varying compositions.

Without being bound to any specific theory, the inventors believe that the presence of boron provides for wettability and for lowering of the melting point, and the silicon provides for lowering of the melting point.

A boron source refers to elemental boron (B), an alloy or compound containing boron.

A silicon source refers to elemental silicon (Si), an alloy or compound containing silicon.

A mechanical blend of powders refers to mechanical mixing of two or more components. The mechanical blend of powders are particles from different sources, each particles is either a boron source or a silicon source.

Contaminating oxygen refers to inevitable amounts of oxygen which for instance is contained in technical grades etc. of a silicon source or of a boron source, and the amount may be as high as 5 wt % oxygen in the boron source and as high as 5 wt % in the silicon source. The contaminating oxygen may be as high as 10 wt %.

The amount of silicon and boron in the blend depends on purity of silicon and boron, but also on the type of silicon source or boron source which are contained in the blend. For instance if the silicon source is Fe—Si the Fe is heavy and the amount of silicon and boron will be lower. In Table 2 there are a few examples.

TABLE 2

| Blend | B or Si | B₄C, Fe—B, Fe—Si, Ni—B | Si | B | Total weight | Weight of B + Si | Amount of B + Si [wt %] |
|---|---|---|---|---|---|---|---|
| Si/B₄C | 10.0 | 2.6 | | 2.0 | 12.6 | 12.0 | 95.2 |
| Si/Fe—B | 10.1 | 12.5 | | 2.0 | 22.6 | 12.1 | 53.5 |
| B/Fe—Si | 2.0 | 30.2 | 10.1 | | 32.6 | 12.1 | 37.6 |
| Si/Ni—B | 10.1 | 13.0 | | 2.0 | 23.1 | 12.1 | 52.4 |

According to one example the blend of at least one boron source and at least one silicon source comprises boron and silicon in a weight ratio boron to silicon within a range from about 5:100 to about 2:1, preferably from about 5:100 to about 1:1, wherein silicon and boron are present in the blend in at least 50 wt %, preferably silicon and boron are present in the blend in at least 60 wt %, more preferred silicon and boron are present in the blend in at least 70 wt %, most preferred silicon and boron are present in the blend in at least 80 wt %, and wherein the at least one boron source and the at least one silicon source are oxygen free except for inevitable amounts of contaminating oxygen, and wherein the blend is a mechanical blend of powders and particles in the powders have an average particle size less than 160 μm.

One advantage of a particle size less than 250 μm is the ability to distribute the blend as evenly as possible on the substrate.

One advantage of a weight ratio boron to silicon within a range from about 5:100 to about 2:1 is that the obtained braze alloy will have wettability and thus good flow. Good flow is an advantage when brazing joints because the obtained braze alloy will flow from the areas where the braze alloy is obtained and flow to the area of the joint.

According to another example is the blend of at least one boron source and at least one silicon source, wherein the blend comprises boron and silicon in a weight ratio boron to silicon within a range from about 1:10 to about 7:10, wherein silicon and boron are present in the blend in at least 25 wt %, preferably silicon and boron are present in the blend in at least 35 wt %. The at least one boron source and the at least one silicon source are oxygen free except for inevitable amounts of contaminating oxygen, and wherein the blend is a mechanical blend of powders and particles in the powders have an average particle size less than 160 μm, preferably less than 100 μm.

According to another example may the blend of at least one boron source and at least one silicon source, wherein the blend comprises boron and silicon in a weight ratio boron to silicon within a range from about 15:100 to about 4:10, wherein silicon and boron are present in the blend in at least 25 wt %, preferably silicon and boron are present in the blend in at least 35 wt %. The at least one boron source and the at least one silicon source are oxygen free except for inevitable amounts of contaminating oxygen, and wherein the blend is a mechanical blend of powders and particles in the powders have a particle size less than 160 μm, preferably less than 100 μm.

According to another example may the blend of at least one boron source and at least one silicon source, wherein the blend comprises boron and silicon in a weight ratio boron to silicon within a range from about 3:100 to about 100:3, preferably within a range from about 5:100 to about 1:1, wherein silicon and boron are present in the blend within a range from about 40 wt % to about 100 wt %, preferably silicon and boron are present in the blend within a range from about 45 wt % to about 100 wt %. The at least one boron source and the at least one silicon source are oxygen free except for inevitable amounts of contaminating oxygen, and wherein the blend is a mechanical blend of powders and particles in the powders have an average particle size less than 160 μm, preferably less than 100 μm.

According to one example may the blend of at least one boron source and at least one silicon source, wherein the blend comprises boron and silicon in a weight ratio boron to silicon within a range from about 1:10 to about 7:10, wherein silicon and boron are present in the blend within a range from about 40 wt % to about 100 wt %, preferably silicon and boron are present in the blend within a range from about 45 wt % to about 100 wt %. The at least one boron source and the at least one silicon source are oxygen free except for inevitable amounts of contaminating oxygen, and wherein the blend is a mechanical blend of powders and particles in the powders have an average particle size less than 160 μm, preferably the average particle size is less than 100 μm, more preferred less than 50 μm.

According to another example may the blend of at least one boron source and at least one silicon source, wherein the blend comprises boron and silicon in a weight ratio boron to silicon within a range from about 15:100 to about 4:10, wherein silicon and boron are present in the blend within a range from about 40 wt % to about 100 wt %, preferably silicon and boron are present in the blend within a range from about 45 wt % to about 100 wt %. The at least one boron source and the at least one silicon source are oxygen free except for inevitable amounts of contaminating oxygen, and wherein the blend is a mechanical blend of powders and particles in the powders have an average particle size less than 160 μm, preferably the average particle size is less than 100 μm, more preferred less than 50 μm.

According to one example the blend of boron and silicon, wherein the blend comprises boron and silicon in a weight ratio boron to silicon within a range from about 1:10 to about 7:10, wherein silicon and boron are present in the blend within a range from about 40 wt % to about 100 wt %, preferably silicon and boron are present in the blend within a range from about 45 wt % to about 100 wt %. The at least one boron source and the at least one silicon source are oxygen free except for inevitable amounts of contaminating oxygen, and wherein the blend is a mechanical blend of powders and particles in the powders have an average particle size less than 160 μm, preferably the particle size is less than 100 μm, more preferred less than 50 μm.

According to one example the at least one silicon source may be selected from the group consisting of elemental silicon (Si), an alloy or compound containing silicon. The silicon source may be pure or be of technical grade.

According to another example the at least one boron source may be selected from the group consisting of elemental boron (B), an alloy or compound containing boron. The boron source may be pure or be of technical grade.

According to another example the at least one boron source may be selected from, but not limited to, elemental boron, boron carbides, nickel borides, or silicon borides. The at least one silicon source may be selected from, but not limited to, elemental silicon, ferro silicon, iron silicides, silicon carbides, or silicon borides.

According to another example the at least one boron source may be selected from elemental boron, $B_4C$, $B_4Si$, $B_3Si$, NiB, and FeB, and the at least one silicon source may be selected from elemental silicon, FeSi, SiC, and $B_4Si$, $B_3Si$.

According to one example the blend may be a mechanical blend of powders. A blend is defined as mechanical mixing of two or more components. According to the first aspect a blend is a mechanical blend or mechanical mixture of two or more powders, i.e. a blend of "silicon source" powder and "boron source" powder.

The second aspect relates to a composition comprising the blend according to the first aspect of the invention.

According to one example, the composition may further comprise powders of a parent material in combination with any one of the examples of the blend according to the first aspect.

A parent material refers to a metal or alloy that is suitable for brazing as mentioned above. As an example, the parent material may comprise any metal as shown in Table 2.

According to another example the composition may also comprise powders of a parent material, wherein the parent material is present in an amount less than 75 wt % calculated on the total weight of silicon, boron and parent material. Such a composition provides for additional parent material when obtaining the braze alloy during the alloying process. When brazing for instance thin parts or thin plates additional parent material can decreases or reduces the risk of burning through the plates or the parts, as seen in the Experimental Examples below.

According to another example the composition further comprises powders of a braze alloy.

A braze alloy refers to a parent material which is alloyed with melting point depressants, and thus received a lower melting point than the parent material.

According to a further example the composition further comprises at least one binder selected from solvents, water, oils, gels, lacquers, varnish, polymers, wax or combinations thereof.

As an example the binder may be selected from polyesters, polyethylenes, polypropylenes, acrylic polymers, (met)acrylic polymers, polyvinyl alcohols, polyvinyl acetates, polystyrenes, waxes.

According to a further example, the binder may be a polyester, a wax or combinations thereof.

According to a further example, the composition is a paint or the composition is a paste or the composition is a dispersion.

According to a further example, the binder is a gel, and the composition is a paste.

One advantage when the composition is a paste is that the paste easily can be applied to selected areas on the substrate.

According to a further example, the binder is a lacquer or a varnish, and the composition is a paint.

One advantage of a composition being a paint is that the paint easily can be distributed over the surface of the substrate and adhere to the surface and therefore can be handled during for instance transportation, pressing, cutting etc.

According to a further example, the binder is selected from polyesters, polyethylenes, polypropylenes, acrylic polymers, (met)acrylic polymers, polyvinyl alcohols, polyvinyl acetates, polystyrenes, waxes or combinations thereof, and the composition is a paint or the composition is a paste.

According to a further example, the binder is selected from polyesters, polyethylenes, polypropylenes, acrylic polymers, (met)acrylic polymers, polyvinyl alcohols, polyvinyl acetates, polystyrenes, waxes or combinations thereof, and the composition is a paint.

According to a further example, the binder is selected from polyesters, polyethylenes, polypropylenes, acrylic polymers, (met)acrylic polymers, polyvinyl alcohols, polyvinyl acetates, polystyrenes, waxes or combinations thereof, and the composition is a paste.

According to a further example, the blend is dispersed in the binder.

According to a further example, the composition is a dispersion.

One advantage when the composition is a dispersion, is that the binder can easily be evaporated off after the dispersion is applied on the surface of the substrate. Another advantage is less additional carbon is incorporated in the braze alloy.

The third aspect relates also to a product wherein the composition according to the examples of the second aspect may be applied on a substrate. The substrate may be a parent material.

A parent material can be a metal or an alloy, said parent materials is suitable to be brazed as mentioned before. An alloy is defined as an intimate association or compound of two or more elements, the alloy possessing in a marked degree all or most of those characteristics commonly described as metallic. Alloys are compounds not mere mixtures. Boron is classed as metalloid and is not a metal.

Silicon is a tetravalent metalloid and not a metal. Silicon and boron can be alloys when they are in a compound together with a metal element.

Substrate is parts of an obtainable product, the parts could be for instance but not limited to thick parts such as parts of separators or parts of decanters etc. or thin parts such as plates or coils, i.e. the substrate could be any parts that should be joined or coated. Substrate could also be workpieces.

According to one example, the product comprises a substrate of a parent material, which parent material has a solidus temperature above 1100° C., and the product comprises also a composition according any one of the examples according to the second aspect, wherein at least a part of the substrate has a surface layer of the composition The new brazing concept provides for example joints which are obtained by a brazing alloy, which brazing alloy is formed in a melting process of the parent material and a blend of boron and silicon. The brazing alloy in molten form are transported by capillary forces to the area of the joint mainly from neighboring areas. The temperature for the brazing concept is above 900° C., i.e. above delineating point between soldering and brazing. The formed braze alloy is an alloy which has apart for the elements of a parent material liquidus temperature lowering elements. Therefore, the braze alloy has a liquidus temperature lower than the parent material.

According to one example the composition is applied on the substrate, and the average total amount of applied silicon and boron is applied in an average amount less than 1 mg/mm$^2$, preferably within a range from 0.01 to 1 mg/mm$^2$, more preferred within a range 0.02 to 0.8 mg/mm$^2$, most preferred within a range 0.03 to 0.07 mm/mm$^2$.

According to another example the average total amount of applied silicon and boron is applied in an average amount within a range 0.06 to 0.3 mg/mm$^2$ when the substrate has a thickness ≤1 mm.

According to another example the average total amount of applied silicon and boron is applied in an average amount within a range 0.06 to 1 mg/mm$^2$ when the substrate has a thickness ≥1 mm.

According to another example the product may be obtained by applying the composition according to any one of the examples of the second aspect, on the surface of a substrate, said composition may be applied as a paint, or the composition may be applied as a paste, or the composition may be applied as a dispersion.

According to another example the product according to any one of the examples according to the third aspect may be for brazing of joints between contact areas of substrates or the product may be for coatings of substrates, or the product may be for both brazing of joints and coatings of substrate.

According to another example the parent material of the product may be selected from the group consisting of iron based alloys, nickel based alloys, chromium based alloys, copper based alloys and cobolt based alloys.

According to one example the parent material may comprise from about 15 to about 22 wt % chromium, from about 8 to about 22 wt % nickel, from about 0 to about 3 wt % manganese, from about 0 to about 1.5 wt % silicon, optionally from about 1 to about 8 wt % molybdenum, and balanced with iron, all percentage in percent by weight.

According to another example the parent material may comprise from about 15 to about 22 wt % chromium, from about 8 to about 22 wt % nickel, from about 0.2 to about 3 wt % manganese, from about 0.1 to about 1.5 wt % silicon, optionally from about 1 to about 8 wt % molybdenum, and balanced with iron, all percentage in percent by weight.

According to another example the parent material may comprise from about 15 to about 22 wt % chromium, from about 8 to about 22 wt % nickel, from about 1 to about 3 wt % manganese, from about 0.5 to about 1.5 wt % silicon, optionally from about 1 to about 8 wt % molybdenum, and balanced with iron.

According to another example the parent material may comprise more than 80 wt % Ni.

According to another example the parent material may comprise more than 50 wt % Fe, less than 13 wt % Cr, less than 1 wt % Mo, less than 1 wt % Ni and less than 3 w % Mn.

According to another example the parent material may comprise more than 10 wt % Cr and more than 60 wt % Ni.

According to another example the parent material may comprise more than 15 wt % Cr, more than 10 wt % Mo, and more than 50 wt % Ni.

According to another example the parent material may comprise more than 10 wt % Fe, 0.1 to 30 w % Mo, 0.1 to 30 wt % Ni, and more than 50 wt % Co.

According to another example of the third aspect the surface layer of the material may be provided on at least one side of a substrate or the surface layer of the material is provided on both sides of a substrate.

According to another example of the third aspect the substrates may be coils, plates, parts of products.

According to another example of the third aspect the substrates may be cut, formed, pressed or combinations thereof. According to another example the substrates may be heat exchanger plates or reactor plates or parts of separators, or parts of decanters, or parts of valves etc.

Depending on which parent materials are used, there are different preferred parent material having different solidus temperature, i.e. the temperature point at which a material solidifies. According to the invention may the solidus temperature of the parent material be above 1100° C. According to one alternative of the invention may the solidus temperature of the parent material be above 1220° C. According to another alternative of the invention may the solidus temperature of the parent material be above 1250° C. According to a further alternative of the invention may the solidus temperature of the parent material be above 1300° C.

The surface layer may be applied as a powder of the blend or by means such as physical vapor deposition (PVD), or chemical vapor deposition (CVD). Physical vapor deposition (PVD) is a variety of vacuum deposition and is a general term used to describe any of a variety of methods to deposit thin films by the condensation of a vaporized form of the desired film material onto various work-piece surfaces, e.g. onto semiconductor wafers. The application method involves purely physical processes such as high temperature vacuum evaporation with subsequent condensation, or plasma sputter bombardment rather than involving a chemical reaction at the surface to be coated as in chemical vapor deposition. Chemical vapor deposition (CVD) is a chemical process used to produce high-purity, high-performance solid materials. The process is for example used in the semiconductor industry to produce thin films. In a typical CVD process, the wafer, i.e. the substrate, is exposed to one or more volatile precursors, which react and/or decompose on the substrate surface to produce the desired deposit.

Frequently, volatile by-products are also produced, which are removed by gas flow through the reaction chamber.

The forth aspect relates to a braze alloy layered product comprising a layer of braze alloy and a substrate, wherein the braze alloy layered product is obtained by heating a product according to any one of the examples of the third aspect, and wherein the braze alloy layer has a melting point lower than the melting point of the substrate.

Another example relates to a braze alloy layered product, said braze alloy layered product may comprise a composition according to any one of the examples of the second aspect, said composition comprises a blend, wherein a layer of braze alloy has been obtained on the surface of the substrate by alloying the blend with elements in the surface of the substrate and heating the substrate and the composition to a temperature higher than the solidus temperature of the obtained braze alloy, and that the obtained braze alloy may have a melting point lower than the melting point of the substrate.

According to one example of the braze alloy layered product the substrates may be cut, formed, pressed or combinations thereof before the application of the surface layer of the composition, or wherein the substrates may be cut, formed, pressed or combinations thereof after the application of the surface layer of the composition, or wherein the substrates may be cut, formed, pressed or combinations thereof after obtaining the brazing alloy on the surface of the base metal.

The braze alloy layered product may be obtained by pre-brazing in such a way that the parent material and the surface layer may be heated to a temperature higher than the solidus temperature of the obtained braze alloy in the braze layer and lower than the solidus temperature of the parent material. A layer of braze alloy is obtained on the parent material in a pre-brazing step. The braze alloy in the surface layer may comprise the blend of according to the first aspect and elements of the parent material.

According to one example the products may have other forms and the surface layer of the blend could be on one side of the product, single surface layer, or on two sides of the product, double surface layers, or the blend could be on several sides of the product. The product may be cut, could be formed, could be pressed or combinations thereof, before the application of the surface layer, after the application of the surface layer, or after the pre-brazing step.

The fifth aspect relates to a method of providing a product having at least one brazed joint between contact areas of substrates comprising:

Step (i) applying at least one silicon source and at least one boron source on at least one substrate;

Step (ii) assembling the applied substrates with at least one additional substrate with or without applied silicon source or boron source;

Step (iii) heating the assembled substrates to a brazing temperature below 1250° C., in a furnace in vacuum, in an inert gas, in a reducing atmosphere, or combinations thereof; and Step (iv) cooling the assembled substrates and obtaining a product having at least one brazed joint between contact areas of the substrates.

Contact areas refer to the areas where a first substrate is in contact with a second substrate, and where a joint will be formed during brazing.

Assembling refers to stacking of for instance plates but not limited to, such as heat exchanger plates. Assembling refers further to assembling of parts.

According to one example the method may comprise applying a mechanical blend of at least one silicon source and the at least one boron source.

According to one example the method may comprise that the at least one silicon source and the at least one boron source are the same, preferably the boron source and the silicon source are silicon borides.

According to one example the method may comprise that the at least one silicon source may be applied as one layer on the substrate, and the at least one boron source may be applied as another layer on the substrate.

According to one example the method may comprise that the at least one boron source may be applied as one first layer on the substrate, and the at least one silicon source may be applied as second layer on top of the first layer on the substrate.

According to one example the method may comprise that the at least one boron source may be applied as one layer on a first substrate and at least one silicon source may be applied as one layer on a second substrate prior to assembling the two substrates in step (ii) and providing joints between contact areas between the two substrates in step (iii).

According to one example the method may comprise that the at least one silicon source and at least one boron source may be within the same blend and silicon and boron may be present in the blend within the range 25 wt % to 100 wt %, and that the blend is a mechanical blend of powders.

According to another example the method may comprise that step (i) comprises applying a composition comprising a blend of at least one silicon source and at least one boron source, and that the composition is applied on at least part of one surface on at least one substrate.

According to one example the method may comprise that the at least one silicon source and at least one boron source may be applied on one or more substrates as a blend, wherein the blend comprises boron and silicon in a weight ratio boron to silicon within a range within a range from about 3:100 wt/wt to about 100:3 wt/wt, preferable a weight ratio boron to silicon within a range from about 5:100 to about 1:1. More preferred the blend may have a weight ratio boron to silicon within a range from about 1:10 to about 7:10, and most preferred the blend may have a weight ratio boron to silicon within a range from about 15:100 to about 4:10. Silicon and boron together may be present in the blend within a range from about 25 wt %, preferably from 35 wt %, more preferred 40 wt % to about 100 wt %, most preferred silicon and boron together may be present in the blend within a range from about 45 wt % to about 100 wt %.

According to a further example the method may comprise that step (i) comprises applying the composition as a paint on at least part of one surface on at least one substrate.

According to a further example the method may comprise that step (iii) comprises heating the assembled substrates, obtaining a molten phase of braze alloy on the substrate(s) and letting the molten phase be transferred by capillary forces to the contact areas between the substrates.

A molten phase may be the phase that melts and has a lower melting temperature than the substrate, and the molten phase may be obtained when silicon and boron alloys with the elements on the surface of the substrate.

One example of the method according to the fifth aspect, the heating step (step (iii)) comprises heating the product to a temperature of at least 900° C., preferably of at least 1000° C., more preferred of at least 1040° C., most preferred of at least 1100° C.

One example of the method according to the fifth aspect, the method comprises an additional step before the applying step, i.e. step (i), said additional step comprises cutting or forming or combinations thereof of the substrate(s) prior to the applying step.

Another example of the method according to the fifth aspect, the method comprises an additional step between the applying step, i.e. step (i), and the assembling step, i.e. step (ii), said additional step comprises cutting or forming or combinations thereof of the product from the applying step prior to the assembling step.

Another example of the method according to the fifth aspect, the method comprises a first additional step after the applying step, the first step additional step comprises heating the product from the applying step to a temperature to allow obtaining of a braze alloy layer on the substrate, and cooling the obtained substrate having the obtained layer of braze alloy.

Another example of the method according to the fifth aspect, the method comprises a second additional step, wherein the second additional step comprises the cutting or forming or combinations thereof of the substrate having the obtained layer of braze alloy.

According to one example the method may comprise that brazed heat exchanger plates or brazed reactor plates may be obtained.

According to one example the method may comprise that the obtained brazed product is selected from heat exchangers, plate reactors, parts of reactors, parts of separators, parts of decanters, parts of pumps, parts of valves.

According to one example the brazed product that may be obtained in step (iv) may be provided with a joint(s) obtained by obtaining a brazing alloy in a melting process of the parent material and the blend, and transporting by capillary forces the brazing alloy in melted form to the area of the joint(s) mainly from neighboring areas.

According to one example of the fifth aspect the solidus temperature of the parent material may be above 1220° C. According to another example may the solidus temperature of the parent material be above 1250° C. According to a further example may the solidus temperature of the parent material be above 1300° C.

According to one example the obtained product may be brazed at a temperature below 1250° C. According to another example may the product be brazed at a temperature below 1200° C. According to a further example the product may be brazed at a temperature above 1100° C. According to a further example the product may be brazed within a range from about 1100° C. to about 1250° C.

The brazed product obtained by the method according to the examples of fifth aspects may have joints. The joints of the brazed product are obtained by the formed braze alloy, which braze alloy is formed in a melting process from the base metal and the blend, and flown to the joint from neighboring areas, elements found in the brazing alloy apart from the parent material elements are Si, B and optionally C, and wherein the parent material has a solidus temperature above 1100° C.

In the brazed product obtained by the method the volume of the formed braze alloy is calculated from the following formula, see also FIG. 2:

$$\text{Volume} = \text{total area } A \times \text{length of joint}$$

$$\text{Total area } A = ((X-B)/2) \times ((X-B)/2) \times \tan \alpha$$

Wherein A is total area of the two triangles, X is the total width of the formed joint, B is the part of the formed joint where the volume of the formed braze alloy in the center of the joint is negligible, and the height is calculated by measuring the angle α, which is the angle of the between tangent of the pressed beam to the base.

The sixth aspect relates to a method for providing a product according to any one of the examples of the third aspect, wherein the method comprises the following steps:
Step (i) applying a composition according to any one of the examples of the second aspect on at least a part of at least one surface on at least one substrate;
Step (ii) obtaining a product where the composition is applied on at least a part of a surface on at least one substrate.

The seventh aspect relates to a method for providing a braze alloy layered product, which method comprises the following steps:
Step (i) applying a composition according to any one of the examples of the second aspect on one or more substrates obtaining a first intermediate product; and
Step (ii) heating the product from step (i) to a temperature higher than the solidus temperature of the obtained braze alloy and lower than the solidus temperature of the substrate, and obtaining a molten phase of braze alloy; and
Step (iii) cooling the heated product from step (ii), and obtaining a braze layered product having a layer of braze alloy on the surface of the substrate.

According to another example the method for providing a braze alloy layered product comprises:
Step (i) applying a composition according to any one the examples of the second aspect on one or more substrates;
Step (ii) heating the applied substrate from the applying step to a temperature higher than the solidus temperature of the obtained braze alloy and lower than the solidus temperature of the substrate, and obtaining a layer of molten phase of braze alloy; and
Step (iii) cooling the substrate having the molten phase of braze alloy and obtaining a braze alloy layered product.

The eight aspect relates to a brazed product obtained by the method according to any one of the examples of the fifth aspect.

The ninth aspect relates to a use of a blend according to any one of the examples of the first aspect, said blend is used as melting point depressants for providing a braze alloy on a surface of a substrate.

The tenth aspect relates to a use of a composition according to any one of the examples of the second aspect, for brazing of parts or plates of heat exchangers, plates of reactors, parts of reactors, parts of separators, parts of decanters, parts of pumps, parts of valves.

The eleventh aspect relates to a use of a composition for brazing of parts or plates for heat exchangers, plate reactors, parts of reactors, parts of separators, parts of decanters, parts of pumps, parts of valves, wherein the composition is a paint.

Examples of products having brazed joints according to the invention are parts or plates for heat exchangers, plate reactors, parts of reactors, parts of separators, parts of decanters, parts of pumps, parts of valves.

Other embodiments and alternatives are defined by the claims.

In the following will the invention be explained by the use of FIGS. 1 to 6. The figures are for the purpose of demonstrating the invention and are not intended to limit its scope.

DETAILED DESCRIPTION OF THE DRAWINGS

Figure 1:
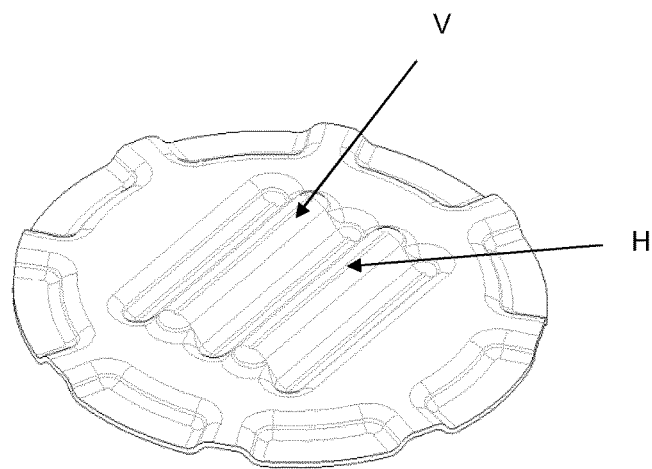
FIG. 1 is showing a circular pressed plate use in the Examples.

FIG. 1 is showing a circular pressed plate, which is 42 mm in diameter and 0.4 mm thick, made of stainless steel type 316L. The pressed plate had two pressed beams V and H, each app 20 mm long. Beam V or v stands for left beam and beam H or h stands for right beam, and v and h are used in Examples 5 and 9.

Figure 2:
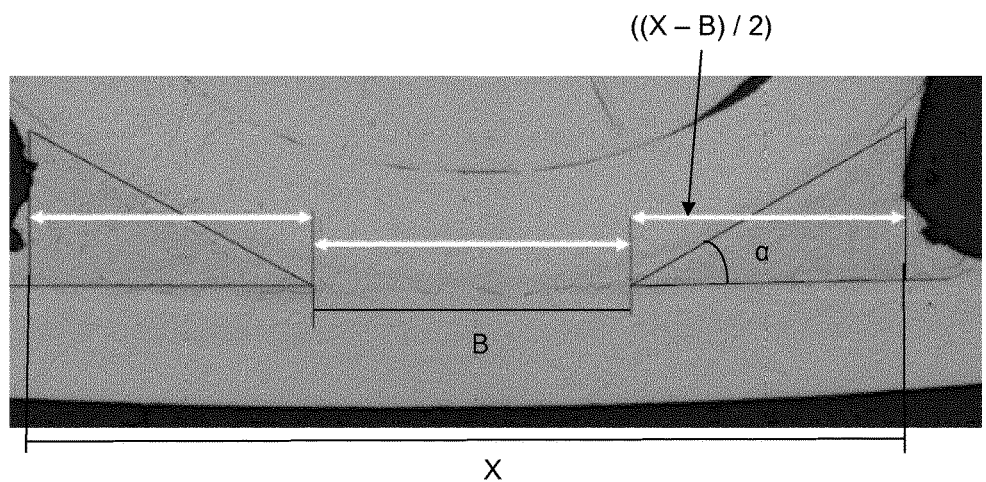
FIG. 2 is showing a graph of "Approximation".

FIG. 2 shows approximation 1 which is based on a cross section of a brazed test sample. The cross section in FIG. 2 shows the pressed beam in the top of FIG. 2. In the bottom of FIG. 2 is the flat, earlier applied plate. In the capillary between the beam and the flat surface a joint is created. To estimate the amount of braze alloy created in the joint following approximations and calculations have been made. It has been estimated that the volume in the center of the joint is negligible. Therefore, the created braze alloy volume for joints with a width, i.e. width B of 1.21 mm or less, are set to zero. On the outer sides of the beam, i.e. ((X−B)/2), formed braze alloy has been accumulated. Thus, the brazing alloy in molted form has been transported by capillary forces to the area of the joint mainly from neighboring areas forming the volumes braze alloy of the triangles.

Figure 3:
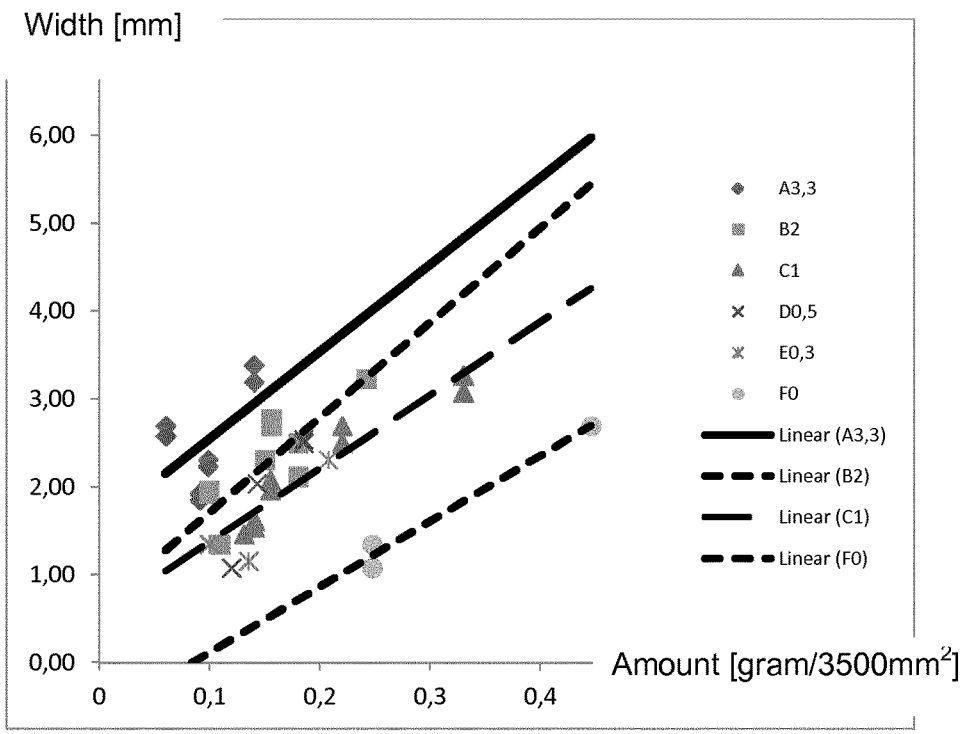
FIG. 3 is showing a diagram wherein the measured width as a function of applied amount (g/3500 mm$^2$) with trend lines.

According to FIG. 2, it is possible to calculate an area by estimate that two triangles are formed on each side of the centre of the joint. The angle in the triangle is measured to app. 28°. The total measured width is called X and the center width, B. The total area (A) of the two triangles are therefore $A=2\times(((X-B)/2)\times((X-B)/2)\times\tan(\alpha))/2$, i.e. for FIG. 2 $A=2\times(((X-1.21)/2)\times((X-1.21)/2)\times\tan(28))/2$. The total created volume of braze alloy, which had flown to the crevices, would be the area times the length of the two beams. Some of the formed braze alloy does not flow to the crevices and is left on the surface. FIG. 3 is showing a diagram wherein the measured width as a function of applied amount (g/3500 mm$^2$) with trend lines. The results of the fillet test are shown in table 8 and 9 of Example 5 and in FIG. 3. The trend lines of FIG. 3 are base on $Y=K\times X+L$. The results of the measured widths and the estimated areas are illustrated in the diagrams of FIG. 3. The applied amounts, see Tables 8 and 9, were from 0.06 gram/3500 mm$^2$ to 0.96 gram/3500 mm$^2$, which correspond to from app 0.017 mg/mm$^2$ to 0.274 mg/mm$^2$, to be compared with app 1.3-5.1 mg of blend per mm$^2$ used in Example 2.

The trend line $Y=K\times X+L$ for the blend were measured, Y is the joint width, K is the inclination of the line, X is the applied amount of blend and L is a constant, see FIG. 3. Thus, the width of braze joint:

$Y$(width for $A3.3$)=1.554+9.922×(applied amount of blend $A3.3$)

$Y$(width for $B2$)=0.626+10.807×(applied amount of blend $B2$)

$Y$(width for $C1$)=0.537+8.342×(applied amount of blend $C1$)

$Y$(width for $F0$)=0.632+7.456×−(applied amount of blend $F0$)

As observed from FIG. 3 blends A3.3 out of blends A3.3, B2, C1, D0.5, E0.3 and F0 give the highest amount of braze alloy in the joint as a function of applied amount of blend. Sample F0 did not give any substantial joints below 0.20 gram per 3500 mm$^2$.

Figure 4:
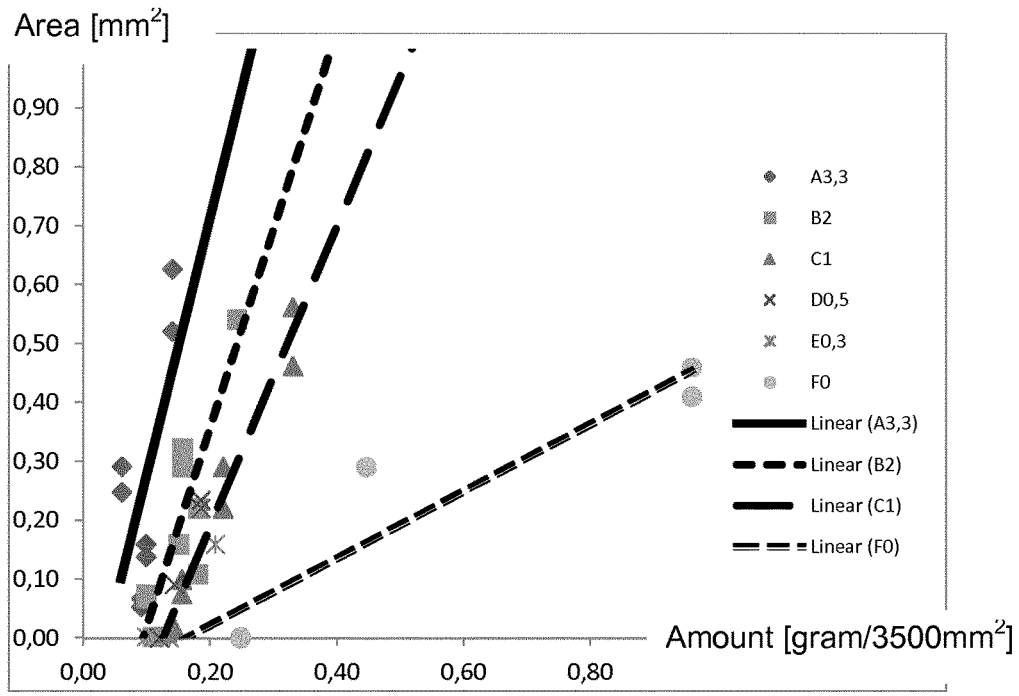
FIG. 4 is showing another diagram in which calculated filled area of the braze joint based on the measured width as a function of applied amount (g/3500 mm$^2$) with trend lines.

FIG. 4 is showing another diagram in which calculated filled area of the braze joint based on the measured width as a function of applied amount (gram/3500 mm$^2$) with trend lines. The trend line Y=K×X−L for the blend were measured, Y is the area, K is the inclination of the line, X is the applied amount of blend and L is a constant, see FIG. 4.

$Y$(area for $A3.3$)=4.361×(applied amount of blend $A3.3$)−0.161

$Y$(area for $B2$)=3.372×(applied amount of blend $B2$)−0.318

$Y$(area for $C1$)=2.549×(applied amount of blend $C1$)−0.321

$Y$(area for $F0$)=0.569×(applied amount of blend $F0$)−0.093

A rough estimation on the created volume based on the diagram in FIG. 4 for e.g. an amount of 0.18 gram per 3500 mm$^2$, excluding sample F0, due to "no" braze joints and sample D0.5 due to too little data, gives a value for the samples for created volume of braze alloy in the joint between the two beams, see below.

Volume($A3.3$)=0.63×length 40(20×2)=25.2 mm$^3$

Volume($B2$)=0.30×length 40(20×2)=12.0 mm$^3$

Volume($C1$)=0.12×length 40(20×2)=4.8 mm$^3$

Volume($E0.3$)=0.10×length 40(20×2)=4.0 mm$^3$

Figure 5:
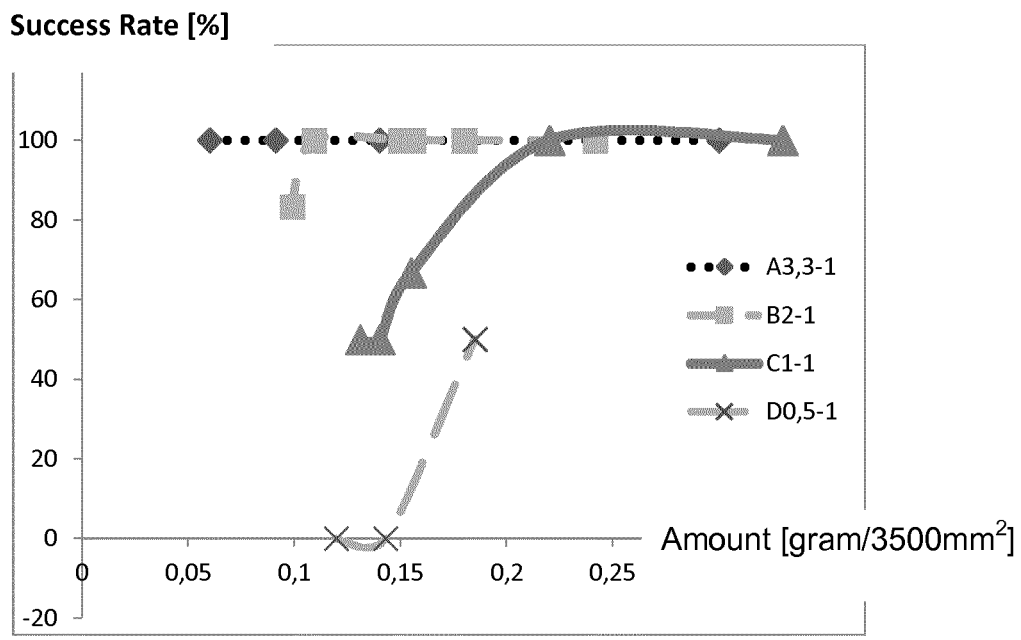
FIG. 5 is showing another diagram in which the % of the tensile tested samples where the joint was stronger or the same as the than the plate material as a function of applied amount of blend (gram per 3500 mm$^2$)

FIG. 5 is showing another diagram in which the % (percent) is the success rate of the tensile tested samples where the joint was stronger or the same as the plate material as a function of applied amount of blend, i.e. gram per 3500 mm$^2$. When the plate was stronger than the joint, resulting in a split of the joint, the result was set to zero. For the samples that the joint were stronger than the plate material the difference in results was not statistical significant.

Figure 6:
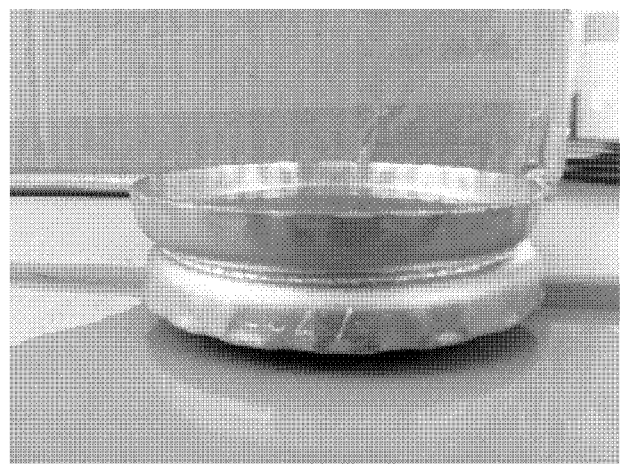
FIG. 6 is showing picture of one of the samples after joining.

In the picture of FIG. 6 is one of the samples shown after joining. The picture shows that there is a formed joint between the two pieces. The joined sample is from Example 10.

The invention is explained in more detail in by means the following Examples and the Examples are for illustrating the invention and are not intended to limit the scope of invention.

EXAMPLES

The tests in these Examples were made to investigate if silicon, Si, is able to create a braze alloy when applied on the surface of a test sample of base metal. Also different amounts of boron, B, were added since boron can decrease the melting point for braze alloys. Boron can also change the wetting behavior of braze alloys. Properties of the tested blends were also investigated. In the Examples wt % is percent by weight and atm % is percent of atoms.

If nothing else is stated the test samples of parent metal for all tests were cleaned by dish washing and with acetone before samples of the blends of silicon and boron were added to the test samples.

Example 1: Preparation of Blends of Silicon and Boron to be Tested

Test sample No. C1 was prepared by blending 118.0 gram of crystalline silicon powder particle size 325 mesh, 99.5% (metal basis) 7440-21-3 from Alfa Aesar-Johnsson Matthey Company, with 13.06 gram of crystalline boron powder particle size 325 mesh, 98%, 7440-42-8 from Alfa Aesar-Johnsson Matthey Company and 77.0 gram of Nicrobraz S-30 binder from Wall Colmonoy in a Varimixer BEAR from Busch & Holm producing 208 gram of paste, see sample C1. All test samples were produced following the same procedure as test sample C1. The blends are summarised in Table 3.

TABLE 3

| Sample No. | Boron [gram] | Silicon [gram] | S-30 Binder [gram] | Total Weight [gram] |
|---|---|---|---|---|
| F0 | 0.00 | 124.7 | 73.3 | 198 |
| E0.3 | 4.30 | 123.9 | 72.1 | 200 |
| D0.5 | 6.41 | 121.2 | 75.0 | 203 |
| C1 | 13.06 | 118.0 | 77.0 | 208 |
| B2 | 24.88 | 104.5 | 72.81 | 202 |
| A3.3 | 11.46 | 22.9 | 19.3 | 54.0 |

Samples G15, H100, I66 and J was prepared the same way as samples F0, E0.3, D0.5, C1, B2 and A3.3 with the exception that another binder was used, the binder was Nicrobraz S-20 from Wall Colmonoy. The test samples are summarised in Table 4.

TABLE 4

| Sample No. | Boron [gram] | Silicon [gram] | S-20 Binder [gram] | Total Weight [gram] |
|---|---|---|---|---|
| G15 | 0.37 | 2.24 | 3.1 | 5.7 |
| H100 | 4.19 | 0 | 5.3 | 9.5 |
| I66 | 1.80 | 2.70 | 5.5 | 10.0 |
| J | 2.03 | 2.02 | 5.0 | 9.0 |

The samples are also calculated to show ratio, percent by weight and percent by atoms, these are shown in Table 5.

TABLE 5

| Blend Sample | Ratio [wt/wt] | | Amount [wt %] | | Amount [atm %] | |
|---|---|---|---|---|---|---|
| No. | Boron | Silicon | Boron | Silicon | Boron | Silicon |
| F0 | 0 | 100 | 0 | 100 | 0 | 100 |
| E0.3 | 3 | 100 | 3 | 97 | 8 | 92 |
| D0.5 | 5 | 100 | 5 | 95 | 12 | 88 |
| C1 | 10 | 100 | 9 | 91 | 21 | 79 |
| B2 | 19 | 100 | 16 | 84 | 33 | 67 |
| A3.3 | 33 | 100 | 25 | 75 | 46 | 54 |
| G15 | 17 | 100 | 14 | 86 | 30 | 70 |
| H100 | 100 | 0 | 100 | 0 | 100 | 0 |
| I66 | 66 | 100 | 40 | 60 | 63 | 37 |
| J | 100 | 100 | 50 | 50 | 72 | 28 |

Measure of Binder (Polymeric and Solvent) Content in the S-20 and S-30 Binder.

Also the content of "dry" material within the gels was tested. Samples of S-20 and S-30 were weighted and thereafter placed in an oven for 18 hours at 98° C. After the samples had been taken out of the oven they were weighted again. The results can be found in Table 6.

TABLE 6

| Sample | Before [gram] | After [gram] | Polymeric fraction [wt %] |
|---|---|---|---|
| S-20 | 199.64 | 2.88 | 1.44 |
| S-30 | 108.38 | 2.68 | 2.47 |

Example 2: Brazing Tests

When testing the flow and wetting characteristics for braze fillers of the prior art, the weight of the applied braze filler is 2.0 gram which correspond to 0.2 gram of silicon. Since blends of silicon and boron were to be tested similar amounts of silicon and boron in the tested compositions were used. The braze filler contains 10 wt % silicon, therefore 0.2 gram of blends of silicon and boron were applied on the test samples. The test samples were circular test pieces having a diameter of 83 mm and a thickness of 0.8 mm and the test pieces were made of stainless steel type 316L. Since it was not expected that 0.2 gram of blend (Si and B) would correspond to 2 gram of braze alloy because a "formed braze alloy" must first be created from the parent metal and Si and B. Therefore, a higher amount, i.e. 0.4 gram was also tested. The behavior of "formed braze alloy" was tested for ability to flow, if the "formed braze alloy" would not flow, then would silicon and boron only diffused into the base metal or even not melt the base metal? All samples were brazed in a vacuum furnace at 1210° C. for 1 hour. Double tests were used. Meaning, two weights 0.2 gram and 0.4 gram, double test samples and six different blends i.e. F0, E0.3, D0.5, C1, B2 and A3.3, adding up to 2×2×6=24 samples. The blends were applied on a circular area having a diameter of app 10 to 14 mm, i.e. a surface of 78 to 154 mm² or app 1.3-5.1 mg of blend per mm².

Results

It was clearly observed that the test pieces of the base metal had melted and some type of melts were created. It was also observed that the melts in some aspects appeared as a braze alloy with flow. Without measuring the size of the wetting it was clear that an increased fraction of boron in the blends resulted in better wetting. However it was also seen that for most samples the entire thickness of the covered area had melted creating a hole was created in the middle of the test piece. For the "0.2 gram samples" five out of twelve test pieces had holes, and for the "0.4 gram pieces" ten out of twelve.

One conclusion is therefore that it is not possible to change from a braze filler paste or the like and apply spots or lines with "comparative equal amounts" of blends of silicon and boron, since the blends of silicon and boron will melt a hole in the base metal if the test sample is thin, in this case 0.8 mm. If thicker test samples are used no holes might appear, but, "grooves" might be created in the base metal. This could be prevented or be improved by adding parent metal as e.g. powder to the silicon and boron blends. If only silicon is applied, i.e. sample F0, the result appear to have less flow and wetting properties than the other samples wherein both silicon and boron are applied.

Example 3: New Applying Procedure

In this Example the test plates were prepared for all fillet tests, corrosion tests and tensile tests at the same time. From Example 2 it was concluded that it could be a risk to apply the blends of silicon and boron in dots or lines on thin walled plates. Therefore, new tests samples were investigated, i.e. new test plates were applied with different blends of Si and B for fillet tests, corrosion tests, and tensile tests.

Accordingly, the new test samples were plates made of stainless steel type 316L. The size of the plates were 100 mm wide, 180 to 200 mm long and the thickness was 0.4 mm. All plates were cleaned by dish washing and with acetone before application of the Si and B blends. The weight was measured. On each plate a 35 mm section at one short side was masked.

The different blends used were A3.3, B2, C1, D0.5, E0.3, F0, G15, H100, and I66, all with the added binder S-30. The plates were "painted" with the blends on the unmasked surface area, which surface area had the size of 100 mm×35 mm. After drying for more than 12 hours in room temperature the masking tape was removed and the plate weight was measured for each plates. The weight presented in Table 7 below is the eight of the totally amount of the blends on the area of 100 mm×35 mm=3500 mm²=35 cm².

TABLE 7

| Samples No. | Ratio B:Si [wt/wt] | Weight of blend + dried binder [gram] | Weight of blend Si + B without binder [gram] | Weight of blend per area [mg/cm²] |
|---|---|---|---|---|
| A3.3 | 33:100 | 0.0983 | 0.0959 | 2.74 |
| B2 | 19:100 | 0.0989 | 0.0965 | 2.76 |
| C1 | 10:100 | 0.1309 | 0.1277 | 3.65 |
| D0.5 | 5:100 | 0.1196 | 0.1166 | 3.33 |
| E0.3 | 3:100 | 0.0995 | 0.0970 | 2.77 |
| H100 | 100:0 | 0.1100 | 0.1073 | 3.07 |
| I66 | 66:100 | 0.0900 | 0.0878 | 2.51 |

Example 4: Corrosion-Bend Test of the Samples

The test plates from Example 3 were cut to 35 mm wide strips, resulting in an applied surface area of 35 mm×35 mm on each strip. A circular pressed plate was placed onto the surface areas of the strips. The circular pressed plate is shown in FIG. 1. The pressed plate had a size of 42 mm in diameter and 0.4 mm thick and was of stainless steel type 316L. The test samples were brazed 1 hour at 1210° C. The specimens prepared for the corrosion tests were applied with blend samples A3.3, B2, C1, D0.5, E0.3, H100, I66 and J, see Table 5.

The specimens were tested according to corrosion test method ASTM A262, "Standard Practices for Detecting Susceptibility to inter-granular Attack in Austenitic Stainless Steels". "Practice E-Copper-Copper Sulfate-Sulfuric Acid. The test for Detecting Susceptibility to Inter-granular Attack in Austenitic Stainless Steels", was selected from the test method. The reason for selecting this corrosion tests was the suspicion that boron might react with chromium in the steel creating chromium borides, mainly in the grain boundaries, which increase the risk for inter-granular corrosion attack. The specimens were placed in boiling 16% sulfuric acid together with copper sulfate in 20 hours, what in the standard is referred to as "practice" and thereafter a bend test, according to chapter 30 in the standard.

Results from the Corrosion Test and Sectioning of the Test Samples

The test pieces were bend tested according to the corrosion test method in chapter 30.1. None of the samples gave indications of inter-granular attack at the ocular investigation of the bent surfaces. After the ASTM investigation the bent specimens were cut, ground and polished and the cross-sections were studied in light optical microscope and in EDS, i.e. Energy Dispersive Spectroscopy. The results are summarized in Table 8.

TABLE 8

| Sample No. | Ocular investigation of surface for corrosion cracks when bent according to the ASTM test | Results of metallurgical experimentation of the cross-sectioned corrosion tested samples and bend tested test samples. SEM-EDS results |
|---|---|---|
| A3.3 | No cracks | No corrosion |
|  |  | A surface layer of app. max 8 μm with a few cracks. The phase that had cracked had a high Cr and B content, most probably due to Cr—B precipitates |
| B2 | No cracks | No corrosion |
|  |  | A surface layer of app. max 8 μm with a few cracks. The phase that had cracked had a high Cr and B content, most probably a chromium boride phase |
| C1 | No cracks | No corrosion or cracks |
| D0.5 | No cracks | No corrosion or cracks |
| E0.3 | No cracks | No corrosion |
|  |  | A surface layer of app. max 60 μm with a few cracks. The phase that had cracked had a high Si content generally <5 wt % |
| H100 | No cracks | Corroded surface and joint |
| I66 | No cracks | No corrosion |
|  |  | A surface layer of app. max 12 μm with a few cracks. The phase that had cracked had a high Cr and B content, most probably a chromium boride phase |
| J | No cracks | No corrosion |
|  |  | A surface layer of app. max 20 μm with a few cracks. The phase that had cracked had a high Cr and B content, most probably a chromium boride phase |

Comments

Apparently when adding high amounts of boron, as for sample H100, J, I66, a brittle layer is formed on the surface. The layer is likely due to a high concentration of chromium boride precipitates, increasing with the amount of boron. No brittle layer was found in the H100 sample, most probably due to the corrosion on the surface. As the amount of chromium borides is increased with increased amount of boron, it also has to be taken into consideration that the corrosion properties might decrease. This would explain why sample H100 that was attacked in the corrosion test. The "negative" effect of boron can be decreased by using thicker substrates and/or longer diffusion times. It is then possible to "dilute" boron by diffusing it into the parent metal. For the smaller amount of boron samples A3.3 and B2, a thinner brittle surface layer was formed. It was seen that for the low amount of boron sample E0.3, a quite thick brittle surface layer, with a high silicon content generally >5 wt % of silicon, was formed. This layer had different characteristics than the brittle surfaces for A3.3, B2, H100, I66 and J. "The negative" effect with silicon can be decreased by using thicker base metals and/or longer diffusion times. It is then possible to "dilute" silicon in the base metal.

Example 5: Fillet Test of the Samples

The test plates from Example 3 were cut to 35 mm wide strips, resulting in an applied surface area of 35 mm×35 mm on each strip. A circular pressed plate was placed onto the surface areas of the strips. The circular pressed plate is shown in FIG. 1. The pressed plate had a size of 42 mm in diameter and 0.4 mm thick and was of stainless steel type 316L. The pressed plate had two pressed beams, each app 20 mm long. The samples were brazed at app 1 hour at app 1200° C.

The results from the fillet test show the width of the braze alloy found in the joint area created between the flat surface area and the contact with a pressed beam in the test sample seen in FIG. 1. The blends were applied onto the flat surface areas before heating. The amount of braze alloy was estimated; see FIG. 2, by an approximation of the area of the fillet cross-section to two triangles formed on each side of the center of the joint. In the middle part there are no or very small amounts of additional formed "brazing alloy". The area of the two triangles can be calculated by measuring the height (h) and the base (b). The total area of the two triangles are summing up to (h)×(b) since there are two triangles. The problem with this calculation is that the height is hard to measure. Therefore we use the following equation for calculating of the two triangle areas:

$$A = ((X-B)/2) \times ((X-B)/2) \times \tan \alpha$$

A is the total area of the two triangles, X is the total width of the formed joint, B is the part of the formed joint where the volume of the formed brazing alloy in the center of the joint is negligible. Thus, the base of each triangle is (X−B)/2. The height is calculated by measuring the angle α, which is the angle between the tangents of the pressed beam the base plate.

To calculate the volume of the total created volume of the formed braze alloy that had flowed to the crevices, the length of the two beams, i.e. each beam is 20 mm, was multiplied with A.

The area of two triangles is the estimated area after brazing in Table 9 and 10. The volume is the volume of the formed brazing alloy on one of the beams. The results from the fillet test are shown in Table 9 and 10, and in FIG. 3. In Table 9 and in Table 10 v and h stand for v=left beam and h=right beam.

TABLE 9

| Sample No. | Applied binder Si + B [gram] | Width [mm] | Estimated Area after brazing [mm²] | Volume [mm³] |
|---|---|---|---|---|
| A3.3x-1v | 0.06 | 2.69 | 0.29 | 5.8 |
| A3.3x-1h | 0.06 | 2.58 | 0.25 | 5.0 |
| A3.3-1v | 0.10 | 2.23 | 0.14 | 2.8 |
| A3.3-1h | 0.10 | 2.31 | 0.16 | 3.2 |
| A3.3-2v | 0.14 | 3.38 | 0.63 | 12.6 |
| A3.3-2h | 0.14 | 3.19 | 0.52 | 10.4 |
| A3.3-3v | 0.09 | 1.92 | 0.07 | 1.4 |
| A3.3-3h | 0.09 | 1.85 | 0.05 | 1.0 |
| B2X-1v | 0.18 | 2.12 | 0.11 | 2.2 |
| B2X-1h | 0.18 | 2.50 | 0.22 | 4.4 |
| B2X-2v | 0.15 | 2.31 | 0.16 | 3.2 |
| B2X-2h | 0.15 | 2.31 | 0.16 | 3.2 |
| B2-1v | 0.10 | 1.96 | 0.07 | 1.4 |
| B2-1h | 0.10 | 1.92 | 0.07 | 1.4 |
| B2-2v | 0.24 | 3.23 | 0.54 | 10.8 |
| B2-2h | 0.24 | 3.23 | 0.54 | 10.8 |

TABLE 9-continued

| Sample No. | Applied binder Si + B [gram] | Width [mm] | Estimated Area after brazing [mm$^2$] | Volume [mm$^3$] |
|---|---|---|---|---|
| B2-3v | 0.16 | 2.77 | 0.32 | 6.4 |
| B2-3h | 0.16 | 2.69 | 0.29 | 5.8 |
| B4v | 0.11 | 1.35 | 0.00 | 0 |
| B4h | 0.11 | 1.35 | 0.00 | 0 |

Fillet test results, samples A3.3-B2/B4

TABLE 10

| Sample No. | Applied binder Si + B [gram] | Width [mm] | Estimated Area after brazing [mm$^2$] | Volume [mm$^3$] |
|---|---|---|---|---|
| C1X-1v | 0.22 | 2.50 | 0.22 | 4.4 |
| C1X-1h | 0.22 | 2.69 | 0.29 | 5.8 |
| C1X-2v | 0.33 | 3.08 | 0.46 | 9.2 |
| C1X-2h | 0.33 | 3.27 | 0.56 | 11.2 |
| C1-1v | 0.13 | 1.46 | 0.01 | 0.2 |
| C1-1h | 0.13 | 1.46 | 0.01 | 0.2 |
| C1-2v | 0.15 | 1.96 | 0.07 | 1.4 |
| C1-2h | 0.15 | 2.08 | 0.10 | 2.0 |
| C1-3v | 0.14 | 1.54 | 0.01 | 0.2 |
| C1-3h | 0.14 | 1.62 | 0.02 | 0.4 |
| D0.5-1v | 0.19 | 2.54 | 0.23 | 4.6 |
| D0.5-1h | 0.19 | 2.50 | 0.22 | 4.4 |
| D0.5-2v | 0.12 | 1.08 | 0.00 | 0 |
| D0.5-2h | 0.12 | 1.08 | 0.00 | 0 |
| D0.5-3v | 0.14 | 2.04 | 0.09 | 1.8 |
| D0.5-3h | 0.14 | 2.04 | 0.09 | 1.8 |
| E0.3-1v | 0.13 | 1.15 | 0.00 | 0 |
| E0.3-1h | 0.13 | 1.15 | 0.00 | 0 |
| E0.3-2v | 0.21 | 2.31 | 0.16 | 3.2 |
| E0.3-2h | 0.21 | 2.31 | 0.16 | 3.2 |
| E0.3-3v | 0.10 | 1.35 | 0.00 | 0 |
| E0.3-3h | 0.10 | 1.35 | 0.00 | 0 |
| F0-1h | 0.45 | 2.69 | 0.29 | 5.8 |
| F0-2v | 0.25 | 1.08 | 0.00 | 0 |
| F0-2h | 0.25 | 1.35 | 0.00 | 0 |
| F0-3v | 0.96 | 2.96 | 0.41 | 8.2 |
| F0-3h | 0.96 | 3.08 | 0.46 | 9.2 |

Fillet test results samples C1 to F0

The results of the measured widths and the estimated areas are presented in the Tables 9 and 10, and illustrated in the diagrams of FIG. 3. The applied amounts, see Tables 9 and 10, varied from 0.06 gram/3500 mm$^2$ to 0.96 gram/3500 mm$^2$. This corresponds to from approx. 0.017 mg/m$^2$ to 0.274 mg/mm$^2$, to be compared with approx. 1.3-5.1 mg of blend per mm$^2$ used in Example 2.

The trend lines $Y=K \times X+L$ for the blends were calculated. Y is the joint width [mm], K is the inclination of the line, X is the applied amount of blend [g] and L is a constant, see FIG. 3. Thus, the width of braze joint:

$Y(\text{width for } A3.3)=1.554+9.922\times(\text{applied amount of blend } A3.3)$ $Y(\text{width for } B2)=0.626+10.807\times(\text{applied amount of blend } B2)$ $Y(\text{width for } C1)=0.537+8.342\times(\text{applied amount of blend } C1)$ $Y(\text{width for } F0)=0.632+7.456\times-(\text{applied amount of blend } F0)$ As observed from the diagram, blend A3.3 out of blends A3.3, B2, C1, D0.5, E0.3 and F0 gives the highest amount of braze alloy in the joint as a function of applied amount of blend. Sample F0 did not give any substantial joints below 0.20 gram per 3500 mm$^2$.

The trend line $Y=K \times X-L$ for the blend were measured, Y is the area [mm$^2$], K is the inclination of the line, X is the applied amount of blend [g] and L is a constant, see FIG. 4.

$Y(\text{area for } A3.3)=4.361\times(\text{applied amount of blend } A3.3)-0.161$ $Y(\text{area for } B2)=3.372\times(\text{applied amount of blend } B2)-0.318$ $Y(\text{area for } C1)=2.549\times(\text{applied amount of blend } C1)-0.321$ $Y(\text{area for } F0)=0.569\times(\text{applied amount of blend } F0)-0.093$ A rough estimation on the created volume based on the diagram in FIG. 4 for e.g. an amount of 0.18 gram per 3500 mm$^2$, excluding sample F0, due to "no" braze joints and sample D0.5 due to too little data, gives values for the samples for created volume of braze alloy in the joint between the two beams, as seen below.

Volume $(A3.3)=0.63\times \text{length } 40(20\times2)=25.2$ mm$^3$

Volume $(B2)=0.30\times \text{length } 40(20\times2)=12.0$ mm$^3$

Volume $(C1)=0.12\times \text{length } 40(20\times2)=4.8$ mm$^3$

Volume $(E0.3)=0.10\times \text{length } 40(20\times2)=4.0$ mm$^3$

Also blends with a higher fraction of boron were tested e.g. G15, H100, I66 and J. All these blends did work quite similar to blend A3.3 and B2 regarding the created braze alloy volume. However, the metallurgical cross section of the brazed samples showed that the amount of borides was greater. For sample H100, i.e. pure boron, also brittle high chromium phases were found on the surface where the blend earlier was applied. The hard phases were most probably chromium borides, which lower the chromium content in the surrounding material, thereby decreasing the corrosion resistance. This may be an issue when good corrosion resistance is wanted but is not an issue for non-corrosive environment. The effect of boron could be decreased by changing the heat treatment and or by using a thicker base metal that can "absorb" a greater amount of boron. For a thicker material, i.e. ≥1 mm, this effect to "absorb" boron in the surface will also be less severe, since the proportion of the surface volume compared to the parent metal volume is much less than for a thin material <1 mm or <0.5 mm. The chromium borides could be an advantage if better wear resistance is wanted. The metallurgical investigation also showed that for sample F0, i.e. pure silicon, a thick brittle layer containing a silicon phase was found. This layer had a thickness of >50% of the plate thickness for some areas in the investigated sample. The similar phase was also found in the joint. Cracks were found in this phase, with a length >30% of the plate thickness. Such cracks will decrease the mechanical performance of the joined product and can be initiating points for corrosion and/or fatigue cracks. The average measured hardness of the phase was over 400 Hv (Vickers). This brittle phase is probably much harder to decrease, compared to the boride phase, by using thicker base metal or a change in heat treatment. Still for thicker base metal this effect can be less severe.

Example 6: Tensile Test of Brazed Joint

The original applied test plates were cut into strips. The size of the plate was approx. 100 mm wide, 180 to 200 mm long and the thickness 0.4 mm. The applied area for each strip was 10 mm by 35 mm=350 mm². A thicker part, 4 mm, of stainless steel type 316L was placed on the applied area covering 30 mm of the total 35 mm applied surface. The ticker part was placed at the end of the strip leaving 5 mm of applied surface not covered by the thick plate. By doing this a decrease in the plate material strength due to the applied blend would be detected by tensile testing, if the joint is stronger than the plate. The thicker plate was also wider than the 10 mm slices. All test samples were brazed at approx. 1200° C. for approx. 1 hour.

After brazing, a 90° peel test was carried out and the thick part of test sample was mounted horizontally to the bottom part in a tensile test machine. The braze strip was firmly bent 90°, to a vertical direction and the strip was mounted to the top part of the tensile test machine. The thick part of the test samples was mounted so that it could move in horizontal direction. The samples were then loaded and the braze joint were split or the strip failed/cracked.

Results

The results are presented as the (%) fraction of non-failed joints for each condition The test failed if the plate was stronger than the joint, which resulted in that the joint were split. If the joint was stronger than the plate (the non-failed condition), the plate cracked/failed before the joint. The results are summarized in Table 11 and in the diagram of FIG. 5.

TABLE 11

| Blend of Si + B [gram] | A3.3-1 Success Rate [%] | B2-1 Success Rate [%] | C1-1 Success Rate [%] | D0.5-1 Success Rate [%] |
|---|---|---|---|---|
| 0.0600 | 100 | | | |
| 0.0910 | 100 | | | |
| 0.0989 | | 83 | | |
| 0.1092 | | 100 | | |
| 0.1196 | | | | 0 |
| 0.1309 | | | 50 | |
| 0.1399 | 100 | | | |
| 0.1402 | | | 50 | |
| 0.1428 | | | | 0 |
| 0.1500 | | 100 | | |
| 0.1548 | | | 67 | |
| 0.1558 | | 100 | | |
| 0.1800 | | 100 | | |
| 0.1850 | | | | 50 |
| 0.2200 | | | 100 | |
| 0.2417 | | 100 | | |
| 0.3000 | 100 | | | |
| 0.3300 | | | | 100 |

Example 7

To establish the relationship between applied amount and the risk for burning holes through the plates, as described in Example 2, new tests were performed. For all tests blend B2, see Table 6, was used. To blend B2 binder S-30 was added. The test pieces were circular stainless steel type 316 with a thickness of 0.8 mm and a diameter of 83 mm. For all samples the blend was applied in the center of the test piece. The applied area was 28 mm², i.e. circular spot having a diameter of 6 mm. All test samples were weighed before and after application, and the results are summarized in Table 12. Thereafter the test samples were placed in room temperature for 12 hours. The samples were weighed again.

The test samples were all put in a furnace and were brazed at 1210° C. for approx. 1 hour. During brazing only the outer edges of each sample were in contact with the fixture material, keeping the plate center bottom surface free from contact with any material during brazing. The reason for keeping the plate center bottom surface free from contacts is that a collapse or a burn through might be prevented if the center material is supported from below by the fixture material.

Applied amount and burn through results for the 0.8 mm samples are summarized in Table 12.

TABLE 12

| Sample No. | Blend of Si + B and additional wet binder S-30 [gram] | Blend of Si + B and additional wet binder S-30 [mg/mm²] | Blend of Si + B and additional dried binder S-30 [mg/mm²] | Calculated amount of Blend of Si + B without binder [mg/mm²] | Burn through [1] or [0] |
|---|---|---|---|---|---|
| 1 | 0.020 | 0.714 | 0.464 | 0.453 | 0 |
| 2 | 0.010 | 0.357 | 0.232 | 0.226 | 0 |
| 3 | 0.040 | 1.429 | 0.928 | 0.905 | 0 |
| 4 | 0.030 | 1.0714 | 0.696 | 0.679 | 0 |
| 5 | 0.050 | 1.786 | 1.161 | 1.132 | 0 |
| 6 | 0.060 | 2.143 | 1.393 | 1.359 | 0 |
| 7 | 0.070 | 2.500 | 1.625 | 1.585 | 0 |
| 8 | 0.080 | 2.857 | 1.857 | 1.811 | 0 |
| 9 | 0.090 | 3.214 | 2.089 | 2.037 | 0 |
| 10 | 0.100 | 3.571 | 2.321 | 2.264 | 0 |
| 11 | 0.110 | 3.928 | 2.554 | 2.491 | 1 |
| 12 | 0.120 | 4.285 | 2.786 | 2.717 | 1 |
| 13 | 0.130 | 4.642 | 3.018 | 2.943 | 1 |
| 14 | 0.150 | 5.357 | 3.482 | 3.396 | 1 |
| 15 | 0.170 | 6.071 | 3.946 | 3.849 | 1 |
| 16 | 0.190 | 6.786 | 4.411 | 4.302 | 1 |
| 17 | 0.210 | 7.500 | 4.875 | 4.755 | 1 |
| 18 | 0.230 | 8.214 | 5.339 | 5.207 | 1 |
| 19 | 0.280 | 10.000 | 6.500 | 6.339 | 1 |
| 20 | 0.290 | 10.357 | 6.732 | 6.566 | 1 |

The tests show that sample 11 has a burn through. Sample 10 has 2.264 mg/mm² applied amount of blend and sample 11 has 2.491 mg/mm². For joining plates having thickness less than 1 mm, there is a risk with an amount within the range from about 2.830 mg/mm² to about 3.114 mg/mm² for burning through the plates, the amount in the middle of this range is 2.972 mg/mm². Therefore, for a plate having a thickness less than 1 mm an amount of less than 2.9 mg/mm² would be suitable for avoiding burning through the plate. The result also show that 2.491 mg/mm² will burn through a plate which is less thick than 0.8 mm and have circular spot having a diameter of 6 mm applied with the blend. For samples with smaller applied areas may have more applied blend per area than samples with larger applied areas.

Example 8

In Example 8 a braze joint between two pressed heat exchanger plates is made by three different ways. The thickness of the heat exchanger plates are 0.4 mm.

In the first and second test samples an iron based braze filler with a composition close stainless steel type 316 was used, see WO 2002/38327. The braze filler had a silicon concentration of about 10 wt %, boron concentration about 0.5 wt % and a decreased amount of Fe of about 10.5 wt %. In the first test sample the braze filler was applied in lines and in the second test sample the braze filler was applied evenly on the surface. In both cases the filler was applied after pressing.

After brazing test sample 1 showed that the braze filler applied in lines was drawn to the braze joints. Some of the braze filler did not flow to the braze joint and therefore increased the thickness locally at the applied line. For test sample 2 the braze filler flowed to the braze joints, however some on the braze filler remained on the surface and increased the thickness. In both test samples, 1 and 2, the amount of added braze filler corresponded to approx. 15 wt % of the plate material.

In test sample 3, A3.3 blend was used, see Table 7. The blend was applied evenly on the plate before pressing. The blend was applied in an amount that would create braze joint with similar sizes as for test samples 1 and 2.

Test sample 3 was applied with an even layer of A3.3. This amount corresponds to a weight ratio blend:plate material of about 1.5:100. When brazing, a braze alloy was formed mainly from the parent metal. This braze alloy flowed to the braze joints. Accordingly, the thickness of the plate decreased since the parent material was dissolved and drawn to the braze joints.

Example 9: Tests with Different Si-Sources and B-Sources

The tests in Example 9 were done to investigate alternative boron-sources and silicon-sources. Blend B2, see Table 7, was selected as reference for the test. The alternative sources were tested with their ability to create a joint. For each experiment either an alternative boron-source or an alternative silicon-source was tested. When using an alternative source the influence of the secondary element was assumed to be zero, meaning that it was only the weight of boron or silicon in the alternative component that was "measured", see Table 13. For the reference blend B2, the weight ratio between silicon and boron is 10 to 2. Each blend was mixed together with S-30 binder and the blend was applied on a steel plate according to Example 1. All samples were brazed in a vacuum furnace at 1210° C. for 1 hour.

TABLE 13

| Sample | Alternative source | Added Amount Si-source [gram] | Added Amount B-source [gram] | Corresponding Amount Si [gram] | Corresponding Amount B [gram] |
|---|---|---|---|---|---|
| Si—B | Si—B | 10.0 | 2.0 | 10.0 | 2.0 |
| Si—B₄C | B₄C | 10.0 | 2.6 | 10.0 | 2.0 |
| Si—FeB | FeB | 10.1 | 12.5 | 10.1 | 2.0 |
| FeSi—B | FeSi | 30.2 | 2.0 | 10.1 | 2.0 |
| Si—NiB | NiB | 10.1 | 13.0 | 10.1 | 2.0 |

The trend line Y=K×X+L for blend B2 was measured, Y is the joint width [mm], K is the inclination of the line for B2, X is the applied amount of blend [g] and L is a constant for no applied amount of blend B2, see FIG. 3. Thus, the width of braze joint Y=0.626+10,807×(applied amount of blend).

In Table 14 v and h stand for l=left beam and r=right beam as in Example 5.

TABLE 14

| Sample | Applied Amount [gram] | Joint Calculated Width Y [mm²] | Joint Measured Width [mm²] |
|---|---|---|---|
| Si—B₄C-l | 0.22 | 3.0 | 2.69 |
| Si—B₄C-r | 0.22 | 3.0 | 2.88 |
| Si—FeB-l | 0.26 | 3.4 | 1.73 |
| Si—FeB-r | 0.26 | 3.4 | 1.73 |
| FeSi—B-l | 0.29 | 3.8 | 2.1 |
| FeSi—B-r | 0.29 | 3.8 | 2.1 |
| Si—NiB-l | 0.39 | 4.8 | 2.69 |
| Si—NiB-r | 0.39 | 4.8 | 2.88 |

The results in Table 13 show that it is possible to use $B_4C$, NiB and FeB as alternatives source to boron. When NiB was used, the created amount of braze alloy was less than for pure boron, however, NiB could be used if an Ni alloying effect is wanted.

Example 10: Tests of Base Metals

In Example 10 a large number of different base metals were tested. All tests except for the mild steel and a Ni—Cu alloy were tested according to test Y.

For test Y two circular pressed test pieces with a thickness of app 0.8 mm were placed onto each other. Each sample had a pressed circular beam. The top faces of the beams were placed towards each other creating a circular crevice between the pieces. For each sample the B2 blend with binder S-20 were applied with a paint brush. The weight of the added amount was not measured since the purpose with the test was to investigate if was possible to create a braze filler and not test how different amounts affected the results. A picture of one of the samples after joining is presented in FIG. 6.

The blend was applied to the mild steel samples and the Ni—Cu samples in the same way. For mild steel the tests made were performed as in example 5 "fillet test". The Ni—Cu test was performed with two flat test pieces. All samples except for the Ni—Cu were "brazed" in a furnace at approx. 1200° C., i.e. 1210° C., for 1 h in vacuum furnace. The Ni—Cu sample was brazed at approx. 1130° C. for approx. 1 h in the same vacuum furnace. After "brazing" a joint had formed between the pieces for all made tests. A flow of created "braze alloy" manly consisting of the parent metal, to the joint was also observed for all tested samples. The results are shown in Table 15.

TABLE 15

| Parent material Sample No. | Cr [wt %] | Fe [wt %] | Mo [wt %] | Ni [wt %] | Cu [wt %] | Mn [wt %] | After Brazing Created joint? | After Brazing Flow of Brazing Alloy? |
|---|---|---|---|---|---|---|---|---|
| 1 | — | 0.3 | — | 99 | — | 0.2 | Yes | Yes |
| 2 | 21 | 0.6 | 16 | 62 | 0.4 | — | Yes | Yes |
| 3 | 22 | 0.7 | 16 | 59 | 1.6 | — | Yes | Yes |
| 4 | 0.6 | 1.9 | 29 | 68 | 0.2 | — | Yes | Yes |

TABLE 15-continued

| Parent material Sample No. | Cr [wt %] | Fe [wt %] | Mo [wt %] | Ni [wt %] | Cu [wt %] | Mn [wt %] | After Brazing Created joint? | After Brazing Flow of Brazing Alloy? |
|---|---|---|---|---|---|---|---|---|
| 5 | 21 | 4.4 | 13 | 58 | — | — | Yes | Yes |
| 6 | 19 | 5.0 | 9.0 | 63 | 0.4 | — | Yes | Yes |
| 7 | 15 | 5.5 | 17 | 60 | — | 0.3 | Yes | Yes |
| 8 | 1.1 | 5.6 | 28 | 63 | 0.6 | 0.4 | Yes | Yes |
| 9 | 19 | 6.2 | 2.6 | 70 | 1.7 | 0.4 | Yes | Yes |
| 10 | 33 | 32 | 1.7 | 33 | 0.4 | 0.6 | Yes | Yes |
| 11 | 27 | 33 | 6.5 | 32 | 1.1 | 1.4 | Yes | Yes |
| 12 | 27 | 36 | 3.4 | 32 | 1.0 | 1.4 | Yes | Yes |
| 13 | 24 | 44 | 7.2 | 23 | 0.3 | 1.5 | Yes | Yes |
| 14 | 20 | 48 | 4.3 | 25 | 1.1 | 1.2 | Yes | Yes |
| 15 | 19 | 50 | 6.3 | 25 | 0.2 | — | Yes | Yes |
| 16 | 20 | 54 | 6.5 | 19 | 0.6 | 0.4 | Yes | Yes |
| 17 | 29 | 64 | 2.4 | 3.5 | — | — | Yes | Yes |
| 18 | 28 | 66 | 2.2 | 3.5 | — | — | Yes | Yes |
| 19 | 0.3 | 1.1 | — | 66 | 31 | 1.6 | Yes | Yes |
| 20 | 0.17 | 99.5 | — | — | — | 0.3 | Yes | Yes |

The results in Table 15 show that braze alloys are formed between the blend and the base metal for each sample 1 to 20. The results also show that joints were created for each tested sample.

The results from examples 1 to 10 show that boron was needed to create a substantial amount of braze alloy, which could fill the joints and also create strength in the joints. The examples also shows that boron was needed for the microstructure, since a thick brittle layer was formed on the samples with no boron.

Example 11: Pre-Brazing Tests

Four different parent materials were tested in Example 11. The blend that was used for the test pieces was blend A3.3, see earlier Examples. All blends were made using Si and B as melting point depressant sources, dispersed in a lacquer from Akzo Nobel (if nothing else stated). The parent material of the test pieces were:
1. Stainless Steel type 316 thickness 0.4 mm
2. Ni type 200 thickness 0.45 mm
3. Monel 400 thickness 1.0 mm
4. Hastelloy C2000 thickness 0.5 mm For material type 316, large test pieces, i.e. size 323 mm×123 mm, were applied with blends wherein the total weight of 2 gram calculated on silicon and boron in the blend without any binder, i.e. lacquer on each large test piece. The calculated amount of silicon and boron corresponds to approximately 0.05 mg/mm$^2$. The test-pieces were coated with blend A3.3, using elemental Si and elemental B in the blend. The ratios of silicon and boron in blend A3.3 can be found in Table 4. Each coated test piece were dried and cured at less than 400° C. in air. In tests with 316, except for the belt furnace test, the large test pieces were used. For the belt furnace test the test piece were adjusted to the max width of the furnace. For the other materials 2-6 different sizes of test pieces were used, but the all applied with 0.05 mg/mm$^2$ silicon and boron.

The Test Pieces were Pre-Brazed According to the Following Pre-Brazing Cycles:

VC1(T)—Vacuum cycle, where T is the maximum temperature, holding time 1 h at max temp.

VC2(T)—Vacuum cycle, where T is the maximum temperature, holding time 2 h at max temp.

BF(T, t)—Belt furnace cycle in Hydrogen atmosphere, where T is the maximum temperature and t is the approx. time at max temp.

The Pre-Brazing Cycles which were Carried Out were:
Nickel type 200, Monel 400, and Hastelloy C2000 tests,
1) VC1(1100° C.) cycle Stainless Steel Type 316 Tests
2) VC2(1040° C.) cycle
3) VC2(1060° C.) cycle
4) VC2(1070° C.) cycle
5) VC2(1080° C.) cycle
6) VC2(1090° C.) cycle
7) VC2(1100° C.) cycle
8) VC2(1110° C.) cycle
9) VC2(1120° C.) cycle
10) VC2(1130° C.) cycle
11) VC2(1140° C.) cycle
12) VC2(1160° C.) cycle
13) VC2(1180° C.) cycle
14) VC2(1200° C.) cycle
15) BF(1100° C., 10 min) cycle
16) BF(1130° C., 10 min) cycle Analysis of Cross-Section of the Test Pieces The cross-sections of all pretreated materials were analyzed using SEM-EDX (Scanning Electron Microscope—Energy Dispersion Spectroscopy). In the cross-sections the composition for the obtained braze alloy layer were analyzed. The silicon content as a function of the depth from the plate surface where the blend had been applied was measured. The results of the analysis are summarized in Table 16.

TABLE 16

Silicon Content at Different Depth from the Surface of the Braze Alloy Layer [wt %]

| Test No. | 15 μm | 30 μm | 45 μm | 60 μm | 75 μm | 90 μm | 105 μm | 120 μm |
|---|---|---|---|---|---|---|---|---|
| 1) Ni 200 | 3-4 | 3-4 | 3-4 | 3-4 | 3-4 | 2-3 | 2-3 | 2-3 |
| 1) Monel 400 | 1.5-5 | 1.5-5 | 1.5-5 | 1.5-5 | 1.5-5 | <0.3 | <0.3 | <0.3 |
| 1) C2000 | 3-6 | 3-6 | 3-6 | <0.1 | <0.1 | <0.1 | <0.1 | <0.1 |
| 2) 316 | 5-6 | 5-6 | 5-6 | 5-6 | <0.6 | <0.6 | <0.6 | <0.6 |
| 3) 316 | 5-6 | 5-6 | 5-6 | 5-6 | <0.6 | <0.6 | <0.6 | <0.6 |
| 4) 316 | 6-7 | 6-7 | 6-7 | 6-7 | 6-7 | <0.6 | <0.6 | <0.6 |
| 5) 316 | 5-7 | 5-7 | 5-7 | 5-7 | 5-7 | <0.6 | <0.6 | <0.6 |
| 6) 316 | 5-6 | 5-6 | 5-6 | 5-6 | 5-6 | <0.6 | <0.6 | <0.6 |
| 7) 316 | 4-6 | 4-6 | 4-6 | 4-6 | 4-6 | <0.6 | <0.6 | <0.6 |
| 8) 316 | 5-7 | 5-7 | 5-7 | 5-7 | 5-7 | <0.6 | <0.6 | <0.6 |
| 9) 316 | 4-7 | 4-7 | 4-7 | 4-7 | 4-7 | 4-7 | 4-7 | <0.6 |
| 10) 316 | 4-8 | 4-8 | 4-8 | 4-8 | 4-8 | <0.6 | <0.6 | <0.6 |
| 11) 316 | 3-8 | 3-8 | 3-8 | 3-8 | 3-8 | <0.6 | <0.6 | <0.6 |
| 12) 316 | 4-7 | 4-7 | 4-7 | 4-7 | 4-7 | <0.6 | <0.6 | <0.6 |
| 13) 316 | 3-7 | 3-7 | 3-7 | 3-7 | 3-7 | <0.6 | <0.6 | <0.6 |
| 14) 316 | 3-6 | 3-6 | 3-6 | 3-6 | 3-6 | <0.6 | <0.6 | <0.6 |
| 15) 316 | 4-9 | 4-9 | 4-9 | 4-9 | <0.6 | <0.6 | <0.6 | <0.6 |

The results from the tests show that there are formed layers on top of the parent materials. The silicon contents are approximate ranges, but differ substantially from the content of silicon in the parent material, i.e. less than 0.6 wt %. The tests results show that the temperature has an effect on the formed braze alloy layer, but the results are more dependent on the type of parent material.

Magnetic Analysis and Analysis of Shape for the Pretreated 316 Materials

Two of the pretreated materials were analyzed, nr 7, VC(1100° C.) and nr 15 BF(1100° C., 10 min). Both pretreated samples showed magnetic properties for the surface layer, clearly different from the parent material, the non-magnetic stainless steel type 316. The magnetic properties were confirmed since it was possible to lift the pre treated samples but not the "non treated samples" with a permanent magnet. Also the shape was changed for the pretreated samples. When inspecting the pre treated plates ocular it was confirmed that the plates were bent with the pre treated surface facing outwards for the created convex surface. This also means that if the material does not have the possibility to deform a (as for this case, a thin plate), or if the material is pre treated on both sides, pressure stresses will be present in the surface. Pressure stresses can e.g. increase the pressure fatigue properties.

Surface Hardness Tests

The obtained braze alloy surface layers were tested for hardness. The samples which were tested were Nickel type 200, Monel 400, Hastelloy C2000, Stainless Steel Type 316 from test sample 15 BF(1100° C., 10 min) and Stainless Steel Type 316 from test sample 16 BF(1130° C., 10 min) applied both with A3.3 made with Si and B and A3.3 made with Si and $B_4C$. The results are summarized in Table 17.

TABLE 17

| HV 0.05 | Depth from braze alloy surface [μm] |
|---|---|
| Monel 400, VC1 (1100° C.), applied with A3.3 | |
| 660 | 29 |
| 660 | 47 |

TABLE 17-continued

| HV 0.05 | Depth from braze alloy surface [μm] |
|---|---|
| 310 | 62 |
| 278 | 105 |
| 258 | 203 |
| 224 | 217 |
| 210 | 262 |
| Nickel 200, VC1 (1100° C.), applied with A3.3 | |
| 401 | 14 |
| 396 | 29 |
| 258 | 47 |
| 221 | 83 |
| 234 | 126 |
| Hastelloy 2000, VC1 (1100° C.), applied with A3.3 | |
| 441 | 15 |
| 404 | 25 |
| 288 | 50 |
| 267 | 77 |
| 255 | 92 |
| 241 | 119 |
| 244 | 161 |
| SS Type 316 BF (1100° C., 10 min), applied with A3.3 | |
| 374 | 26 |
| 298 | 33 |
| 330 | 44 |
| 277 | 77 |
| 274 | 108 |
| SS Type 316 BF (1130° C., 10 min), applied with A3.3 with elemental B | |
| 787 | 14 |
| 277 | 29 |
| 228 | 48 |
| 201 | 96 |
| 178 | 151 |
| 231 | 218 |
| SS Type 316 BF (1130° C., 10 min), applied with A3.3 with $B_4C$ | |
| 909 | 17 |
| 589 | 48 |
| 261 | 53 |
| 253 | 77 |
| 227 | 134 |
| 213 | 168 |
| SS Type 316 VC2 (1100° C.), applied with A3.3 | |
| 1049 | 22 |
| 509 | 32 |

TABLE 17-continued

| HV 0.05 | Depth from braze alloy surface [μm] |
|---|---|
| 326 | 52 |
| 265 | 69 |
| 229 | 105 |
| 207 | 168 |
| SS Type 316 VC2 (1200° C.) applied with A3.3 | |
| 532 | 18 |
| 261 | 38 |
| 243 | 61 |
| 224 | 80 |
| 222 | 128 |
| 229 | 169 |

Results

The hardness tests show that the hardness of the braze alloy layer is harder than the parent materials. All tested parent materials had hardness less than approx. 300 HV0.05 after a heat pre-treatment cycle or a braze cycle. The hardness of the surface layer and the parent material was measured from the parent material original surface to a depth of app 200 um. The increased hardness values was correlated to the earlier measured increase in Si in the surface layer, the braze alloy. The tests show also that the hardness is higher at the surface than closed to the parent materials.

Example 12: Brazability Tests

In this Example the obtained braze alloy layers from Example 11 were tested, such as samples number 2 to 14. One extra sample was tested and it was sample number 17, wherein the material was untreated SS type 316 with applied blend. The tests were carried out for the purpose of finding out if a braze joint could be created between a substrate having a braze alloy layer and another substrate without any braze alloy layer.

The test pieces were plates SS type 316, and the brazing tests were carried out in normal brazing cycles. The test was performed by placing the pre-treated test-plate with the braze alloy layer facing up. A circular pressed plate without any braze alloy, see FIG. 1, was placed on top of the pre-treated test-plate on the braze alloy layer. A weight was applied on the circular pressed plate to hold it in contact with the pre-treated test-plate. The test-plate sample was then exposed to a VC1(T)-cycle in vacuum at a temperature of 1210° C. The result is presented as the size of the brazing area as a function of the pre-treatment temperature. The samples were cut across the circular pressed plate and the width of the center of the obtained joint was measured according to FIG. 2. In Table 18 the average center width of each test samples are summarized.

TABLE 18

| Sample No. | Pre-treatment temp [° C.] | Center Width [mm] |
|---|---|---|
| 1 | 1000 | 2.56 |
| 2 | 1040 | 2.45 |
| 3 | 1060 | 2.53 |
| 4 | 1070 | 2.53 |
| 5 | 1080 | 2.18 |
| 6 | 1090 | 2.14 |
| 7 | 1100 | 2.25 |
| 8 | 1110 | 1.99 |
| 9 | 1120 | 1.91 |
| 10 | 1130 | 2.25 |
| 11 | 1140 | 1.21 |
| 12 | 1160 | 1.87 |
| 13 | 1180 | 0.78 |
| 14 | 1200 | 0.00 |

The results of these tests show that the higher pre-brazing temperature the less brazed joint, i.e. the braze alloy layer of the pre-brazed samples loses the property to braze joints. Small center width is a result of low brazing property. By losing the brazing property the pre-brazed samples cannot be used for brazing without adding a brazing alloy or adding additional blend of boron and silicon after the pre-brazing step. The critical temperature depends on the parent material. If the parent material has a high melting point then the obtained braze alloy layer could still have brazing property at a higher pre-brazing temperature.

Example 13: Tensile Tests

Six different parent materials were tested in Example 13. The test samples were applied with different bends, the blends were A3.3, B2 and C1, all made using Si and B as melting point depressant sources, in a lacquer from Akzo Nobel (if nothing else stated). Large test pieces of parent materials, i.e. size 323 mm×123 mm, were applied with blends. The total weight of 2 g calculated on silicon and boron in the blend without any binder, i.e. lacquer on each large test piece, were applied on the large test pieces. The calculated amount of silicon and boron corresponds to approximately 0.05 mg/mm$^2$.

The samples were of following parent materials:
1. SS Type 316 thickness 0.4 mm
2. Ni Type 200 thickness 0.45 mm
3. Monel 400 thickness 1.0 mm
4. SS Type 254 SMO thickness 0.4 mm
5. Mild Steel thickness 0.4 mm having an iron content >97 wt %
6. Hastelloy C2000 thickness 0.5 mm In this example samples of braze alloy layered materials were tested according to Example 11, sample 1 (Hastelloy C2000).

In these tests two pieces were cut for each tensile test sample. One of the test pieces was cut from a non-treated plate of the same parent material as for the pre-treated piece, i.e. the braze alloy layered piece, see Example 11, or with a surface applied with blend A3.3 dispersed in a lacquer from Akzo Nobel. The size of the test pieces were, length 41-45 mm, and width 11.3-11.7 mm. Each test piece was bent in the middle, using a pressing tool. The shape of the upper part of the pressing tool was a 3 mm thick plate approx. 150 mm long. The lower part of the tool is made of a thick plate with a "machined groove" with a radius of 1.9 mm. When pressing, the test piece were applied on the lower pressing tool with the pre-treated surface facing downwards, where after the plates were pressed/bent in the middle of the length when pressed. Sometimes an extra bending was made by hand after the pressing, e.g. if the material had a large spring back or were "too thick".

Fixturing of the Samples

A first bent test piece with the pre-treated surface or applied surface was placed with the treated surface facing upwards when placed onto a 1 mm plate (22×22 mm) with "non-wetting" properties. This plate together with the first bent test piece was then mounted into the diagonal of a tube having a square cross section. The dimensions of the tube were 17×17 mm inside and 20×20 mm outside. The thickness of the tube was app 1.4 mm and the height 55 mm.

A second bent non-treated test piece was placed that the curved part of the second test piece was placed on top of the curved part of the first bent test piece. The second test piece was placed in the tube in perpendicular direction to the first test piece creating a small contact area between the two pieces. The fixtured samples were then heated in a VC1 (1210° C.) cycle.

Tensile Tests

The brazed tests samples were after brazing mounted in a tensile test machine "Instron Corporation Series IX Automated Materials Testing System". The Crosshead Speed was approx. 1 mm/min. The load was measured in kN. Tensile test results, both for pre-treated (PRE) samples and not pre-treated samples are summarized in Table 19.

TABLE 19

| Sample | Average load at max load [kN] |
|---|---|
| Hastelloy C 2000 | |
| Braze Alloy Layered product | 1.144 |
| A3.3 Lacquer | 1.330 |
| B2 Lacquer | 1.214 |
| C1 Lacquer | 1.325 |
| Ni Type 200 | |
| Braze Alloy Layered product | 0.359 |
| A3.3 Lacquer | 0.360 |
| Monel 400 (1140° C.) | |
| Braze Alloy Layered product | 1.522 |
| A3.3 Lacquer | 1.487 |
| SS Type 254SMO | |
| Braze Alloy Layered product | 1.525 |
| A3.3 Lacquer | 1.298 |
| C1 Lacquer | 0.802 |
| SS Type 316 | |
| Braze Alloy Layered product BF(T, t)-cycle (carried out in hydrogen (atm) at a temperature of 1100° C.) | 1.166 |
| A3.3 Lacquer | 1.693 |
| B2 Lacquer | 1.602 |
| C1 Lacquer | 1.565 |

Table 19 shows that brazed joints from samples with braze alloy layer have comparable tensile strength as brazed joints from samples, which have a blend of silicon and boron dispersed in a binder applied on the surface. These tests results show therefore that the selection of brazing method may depend on other aspects than expected tensile strength of the produced joints.

The invention claimed is:

1. A mechanical mixture of two or more components comprising at least one boron source and at least one silicon source, wherein the components have an average particle size less than 250 μm, and each component is either (i) of a silicon source selected from the group consisting of at least one of elemental silicon, ferro silicon, iron silicides, silicon carbides, and silicon borides or (ii) of a boron source selected from the group consisting of at least one of elemental boron, boron carbides, nickel borides, and silicon borides,
   wherein the mechanical mixture comprises boron and silicon in a weight ratio boron to silicon within a range from about 5:100 to about 1:1,
   wherein silicon and boron are together present in the mechanical mixture in at least 25 wt %, and
   wherein the at least one boron source and the at least one silicon source are oxygen free except for inevitable amounts of contaminating oxygen, and wherein the inevitable amount of contaminating oxygen is less than 10 wt %.

2. A composition comprising the mixture according to claim 1.

3. The composition according to claim 2, wherein the composition further comprises powders of a parent material, wherein the parent material is present in an amount less than 75 wt % calculated on the total weight of silicon, boron and parent material.

4. The composition according to claim 2, wherein the composition further comprises powders of a braze alloy.

5. The composition according to claim 2, wherein the composition further comprises at least one binder selected from solvents, water, oils, gels, lacquers, varnish, polymers, wax or combinations thereof.

6. The composition according to claim 5, wherein the mixture is dispersed in the at least one binder.

7. The composition according to claim 5, wherein the at least one binder is selected from polyesters, polyethylenes, polypropylenes, acrylic polymers, (meth)acrylic polymers, polyvinyl alcohols, polyvinyl acetates, polystyrenes, waxes, or combinations thereof.

8. The composition according to claim 2, wherein the composition is a paint, or the composition is a paste, or the composition is a dispersion.

9. A brazed product obtained by a method for providing a product having at least one brazed joint between contact areas between substrates, said method comprising the steps of:
   applying the composition of claim 2 on at least one substrate;
   assembling the at least one substrate with at least one additional substrate, such that the at least one silicon source and the at least one boron source are present between contact areas of the at least one substrate and the at least one additional substrate;
   heating the assembled substrates to a brazing temperature below 1250° C., in a furnace in vacuum, in an inert gas, in a reducing atmosphere, or combinations thereof; and
   cooling the assembled substrates to obtain the product having at least one brazed joint between contact areas of the at least one substrate and the at least one additional substrate.

10. A product comprising a substrate of a parent material and the composition according to claim 2, said parent material having a solidus temperature above 1100° C.,
    wherein at least a part of the surface of the substrate of the parent material has a coated layer of the composition.

11. The product according to claim 10, wherein the average total amount of silicon and boron in the coated layer is less than 1 mg/mm².

12. The product according to claim 10, wherein the parent material is selected from the group consisting of iron based alloys, nickel based alloys, chromium based alloys, cobalt based alloys, and copper based alloys having a melting point of at least 1100° C.

13. The product according to claim 10, wherein the parent material comprises from about 15 to about 22 wt % chromium, from about 8 to about 22 wt % nickel, from about 0 to about 3 wt % manganese, from about 0 to about 1.5 wt % silicon, from about 0 to about 8 wt % molybdenum, and balanced with iron.

14. The product according to claim 10, wherein the parent material comprises at least 80 wt % Ni.

15. The product according to claim 10, wherein the parent material comprises more than 50 wt % Fe, less than 13 wt % Cr, less than 1 wt % Mo, less than 1 wt % Ni and less than 3 wt % Mn.

16. The product according to claim 10, wherein the parent material comprises more than 10 wt % Cr and more than 60 wt % Ni.

17. The product according to claim 10, wherein the parent material comprises more than 15 wt % Cr, more than 10 wt % Mo, and more than 50 wt % Ni.

18. The product according to claim 10, wherein the parent material comprises more than 10 wt % Fe, 0.1 to 30 wt % Mo, 0.1 to 30 wt % Ni, and more than 50 wt % Co.

19. The product according to claim 10, wherein the substrate is selected from the group consisting of coils, plates, parts, and sheets.

20. The product according to claim 10, wherein a braze alloy layered product is obtained by heating said coated layer of the composition and the substrate, and thereby the composition is alloying with elements of the substrate, and wherein the obtained braze alloy layer has a melting point lower than the melting point of the parent material.

21. The mixture according to claim 1, wherein silicon and boron are together present in the mechanical mixture in at least 35 wt %.

22. A method for providing a product having at least one brazed joint between contact areas between substrates, said method comprising the steps of:
applying the composition of claim 2 on at least one substrate;
assembling the at least one substrate with at least one additional substrate, such that the at least one silicon source and the at least one boron source are present between contact areas of the at least one substrate and the at least one additional substrate;
heating the assembled substrates to a brazing temperature below 1250° C., in a furnace in vacuum, in an inert gas, in a reducing atmosphere, or combinations thereof; and
cooling the assembled substrates to obtain the product having at least one brazed joint between contact areas of the at least one substrate and the at least one additional substrate.

23. The method according to claim 22, wherein silicon and boron are present in the mixture within the range 25 wt % to 100 wt %, and the mixture is a mechanical mixture of powders.

24. The method according to claim 22, wherein the at least one silicon source and the at least one boron source is the same source.

25. The method according to claim 22, wherein the applying step comprises applying the at least one boron source and at least one silicon source on at least a part of one surface on at least one substrate, the at least one boron source being selected from elemental boron, boron carbides, nickel borides, and silicon borides, and the at least one silicon source being selected from elemental silicon, ferro silicon, iron silicides, silicon carbides, and silicon borides.

26. The method according to claim 22, wherein the heating step comprises heating the assembled substrates, obtaining a molten braze alloy on the substrate(s) and letting the molten braze alloy be transferred by capillary forces to the contact areas between the substrates.

27. The method according to claim 22, wherein the heating step comprises heating the product to a temperature of at least 900° C.

28. The method according to claim 22, wherein the method comprises an additional step before the applying step, said additional step comprises cutting or forming or combinations thereof of the substrate(s) prior to the applying step.

29. The method according to claim 22, wherein the method comprises an additional step between the applying step and the assembling step, said additional step comprises cutting or forming or combinations thereof of the product from the applying step prior to the assembling step.

30. The method according to claim 22, wherein the method comprises a first additional step after the applying step, the first step additional step comprises heating the product from the applying step to a temperature to allow obtaining of a braze alloy layer on the substrate, and cooling the obtained substrate having the obtained layer of braze alloy.

31. The method according to claim 30, wherein the method comprises a second additional step, wherein the second additional step comprises the cutting or forming or combinations thereof of the substrate having the obtained layer of braze alloy.

32. The method according to claim 22, wherein the obtained brazed product having at least one brazed joint is selected from heat exchangers, plate reactors, parts of reactors, parts of separators, parts of decanters, parts of pumps, parts of valves.

33. A method for manufacturing a product comprising a substrate of a parent material and the composition according to claim 2, said parent material having a solidus temperature above 1100° C., wherein at least a part of the surface of the substrate has a coated layer of the composition, said method comprising the step of applying the composition on at least a part of at least one surface on at least one substrate.

34. A method for manufacturing a braze alloy layered product, said method comprising the steps of:
applying the composition according to claim 2 on one substrate;
heating the applied substrate to a temperature lower than the solidus temperature of the substrate to obtain a layer of molten phase of braze alloy; and
cooling the substrate having the molten phase of braze alloy to obtain a braze alloy layered product,
wherein the temperature during heating further is higher than the solidus temperature of the obtained braze alloy.

35. A method for providing a product having at least one brazed joint between contact areas between substrates, said method comprising the steps of:
applying at least one silicon source as one layer on at least a first substrate; and
applying at least one boron source as another layer on the first substrate in order to form the composition of claim 2;
wherein the at least one silicon source and the at least one boron source comprise particles having an average particle size less than 250 μm, wherein boron and silicon are present in a weight ratio of boron to silicon within a range from about 5:100 to about 1:1, wherein silicon and boron are present in the layers in an amount of at least 25 wt %, and wherein the at least one boron source and the at least one silicon source are oxygen free except for inevitable amounts of contaminating oxygen, and wherein the inevitable amount of contaminating oxygen is less than 10 wt %;

assembling the at least one first substrate with at least one second substrate, such that the at least one silicon source and the at least one boron source are present between contact areas of the at least one first substrate and the at least one second substrate;

heating the assembled first and second substrates to a brazing temperature below 1250° C., in a furnace in vacuum, in an inert gas, in a reducing atmosphere, or combinations thereof; and cooling the assembled first and second substrates to obtain the product having at least one brazed joint between contact areas of the at least one first substrate and the at least one second substrate.

* * * * *